United States Patent
Dao

(10) Patent No.: US 10,779,163 B2
(45) Date of Patent: Sep. 15, 2020

(54) NETWORK ARCHITECTURE HAVING MULTICAST AND BROADCAST MULTIMEDIA SUBSYSTEM CAPABILITIES

(71) Applicant: Ngoc Dung Dao, Ottawa (CA)

(72) Inventor: Ngoc Dung Dao, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 436 days.

(21) Appl. No.: 15/861,096

(22) Filed: Jan. 3, 2018

(65) Prior Publication Data

US 2018/0192289 A1    Jul. 5, 2018

Related U.S. Application Data

(60) Provisional application No. 62/442,644, filed on Jan. 5, 2017.

(51) Int. Cl.
*H04W 12/06* (2009.01)
*H04W 4/06* (2009.01)
(Continued)

(52) U.S. Cl.
CPC ........... *H04W 12/06* (2013.01); *H04L 12/185* (2013.01); *H04L 63/0428* (2013.01); *H04L 63/061* (2013.01); *H04L 63/08* (2013.01); *H04L 67/147* (2013.01); *H04W 4/06* (2013.01); *H04W 12/001* (2019.01); *H04L 63/0464* (2013.01);
(Continued)

(58) Field of Classification Search
CPC ..... H04W 12/06; H04W 12/001; H04W 4/06; H04W 76/40; H04W 12/0052; H04W 12/04; H04L 12/185; H04L 63/0428; H04L 63/061; H04L 63/08; H04L 67/147; H04L 63/0464
See application file for complete search history.

(56) References Cited

U.S. PATENT DOCUMENTS 7,349,412 B1 * 3/2008 Jones ............... H04L 12/66
                                                  370/352
9,467,285 B2 * 10/2016 Holtmanns ........... H04L 9/0838
(Continued)

FOREIGN PATENT DOCUMENTS

CN    1732485 A    2/2006
CN    1874224 A   12/2006
(Continued)

OTHER PUBLICATIONS

A. Gupta and R. K. Jha, "A Survey of 5G Network: Architecture and Emerging Technologies," in IEEE Access, vol. 3, pp. 1206-1232,2015. (Year: 2015).*
(Continued)

*Primary Examiner* — Jung W Kim
*Assistant Examiner* — Sameera Wickramasuriya

(57) ABSTRACT

Examples of network architectures are provided. Some network architecture comprises a core network (CN) sub-architecture and a broadcast-multicast service-centre (BM-SC) sub-architecture. Some network architecture comprises a CN that implements functionality of the BM-SC. The architectures comprise network functions and interfaces between some of the network functions that allow for multicast broadcast multimedia system (MBMS) messaging and transmissions.

19 Claims, 13 Drawing Sheets

(51) Int. Cl.
| | |
|---|---|
| *H04L 29/06* | (2006.01) |
| *H04L 12/18* | (2006.01) |
| *H04L 29/08* | (2006.01) |
| *H04W 12/00* | (2009.01) |
| *H04W 76/40* | (2018.01) |
| *H04W 12/04* | (2009.01) |

(52) U.S. Cl.
CPC ........ *H04W 12/0052* (2019.01); *H04W 12/04* (2013.01); *H04W 76/40* (2018.02)

(56) References Cited

U.S. PATENT DOCUMENTS

| | | | |
|---|---|---|---|
| 2004/0128259 A1 | 7/2004 | Blakeley et al. | |
| 2012/0054785 A1* | 3/2012 | Yang | H04N 21/4425 725/16 |
| 2015/0063187 A1* | 3/2015 | Lin | H04L 12/189 370/312 |
| 2015/0229486 A1* | 8/2015 | Kotecha | H04W 4/06 370/312 |
| 2017/0272532 A1* | 9/2017 | Lynch | H04L 69/22 |
| 2017/0339609 A1* | 11/2017 | Youn | H04W 76/11 |
| 2018/0084527 A1* | 3/2018 | Kaufman | H04W 4/06 |
| 2018/0262423 A1* | 9/2018 | Roeland | H04L 47/31 |
| 2019/0082303 A1* | 3/2019 | Fersman | H04L 65/4084 |
| 2020/0053802 A1* | 2/2020 | Li | H04L 41/5041 |

FOREIGN PATENT DOCUMENTS

| | | |
|---|---|---|
| EP | 1811736 A1 | 7/2007 |
| EP | 2273745 A1 | 1/2011 |
| WO | 2016072814 A1 | 5/2016 |
| WO | 2016159464 A1 | 10/2016 |

OTHER PUBLICATIONS

International Search Report dated Feb. 13, 2018 for corresponding International Application No. PCT/CN2018/071461 filed Jan. 4, 2018.

Intel 3GPP TSG SA WG3 (Security) Meeting #85. S3-161521 pCR to TR 33.899. Remote credential provisioning—for headed devices using captive portal technique. Sep. 29, 2016.

3GPP TR 23.799 V1.0.0. Technical Specification Group Services and System Aspects; Study on Architecture for Next Generation System. Sep. 9, 2016.

Ericsson 3GPP TSG SA WG3 (Security) Adhoc Meeting on FS_NSA. Sep. 29, 2016.

Santos et al: "Multicast/broadcast network convergence in next generation mobile networks", Computer Networks, Elsevier, Amsterdam, NL, vol. 52, No. 1, Nov. 20, 2007, pp. 228-247, XP022354903.

3GPP TS 33.246 V14.0.0 (Dec. 2016), 3rd Generation Partnership Project;Technical Specification Group Services and System Aspects;3G Security;Security of Multimedia Broadcast/Multicast Service (MBMS)(Release 14), Dec. 17, 2016, total 74 pages. XP051230159.

3GPP TR 33.899 V0.5.0 (Oct. 2016), 3rd Generation Partnership Project;Technical Specification Group Services and System Aspects; Study on the security aspects of the next generation system(Release 14), S3-161459, Oct. 2016. total 244 pages. XP51170480.

3GPP TS 23.246 V14.1.0: Multimedia Broadcast/Multicast Service (MBMS); Architecture and functional description; Dec. 2016.

3GPP TS 26.346 V14.1.0: Multimedia Broadcast/Multicast Service (MBMS); Protocols and codecs; Dec. 2016.

* cited by examiner

900

AUSF receives security code sent by MBMS security function for the UE to use for a requested MBMS service
910

↓

AUSF sends security code to the UE
920

FIG. 9

NETWORK ARCHITECTURE HAVING MULTICAST AND BROADCAST MULTIMEDIA SUBSYSTEM CAPABILITIES

CROSS REFERENCE TO RELATED APPLICATIONS

This application claims the benefit of priority to U.S. Provisional Patent Application Ser. No. 62/442,644 filed on Jan. 5, 2017 and entitled Network Architecture Having Multicast and Broadcast Multimedia Subsystem Capabilities, the contents of which are incorporated by reference.

FIELD OF THE INVENTION

The present invention pertains to the field of network communications, and in particular to a network architecture having multicast and broadcast multimedia subsystem (MBMS) capabilities.

BACKGROUND

Multicast and broadcast multimedia subsystem (MBMS) capabilities have been developed for third generation (3G) and fourth generation (4G) networks. Current applications of MBMS include television broadcasting, video unicast streaming, vehicular applications for traffic message broadcasting, and public safety/warning broadcast system. There is currently no known fifth generation (5G) network architecture having multicast and broadcast multimedia subsystem (MBMS) capabilities.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a network architecture having multicast and broadcast multimedia subsystem (MBMS) capabilities.

In accordance with embodiments of the present invention, there is provided a network architecture. The network architecture comprises a core network (CN) and a broadcast-multicast service-centre (BM-SC). The CN comprises an authentication server function (AUSF) and a network exposure function (NEF) that are communicatively connected via a NG AUSF-NEF interface. The BM-SC comprises a security function that is communicatively connected to the NEF via a NG MBMS-NEF interface.

In accordance with embodiments of the present invention, there is also provided another network architecture. The network architecture comprises a CN and a BM-SC. The CN comprises an AUSF, a NEF and a policy control function (PCF). The AUSF and the NEF are communicatively connected via a NG AUSF-NEF interface. The NEF and the PCF are communicatively connected via a NG PCF-NEF interface. The BM-SC comprises a membership function that is communicatively connected to the NEF via a NG MBMS-NEF interface. The membership function is also communicatively connected to the PCF via a NG5 interface.

In accordance with embodiments of the present invention, there is also provided another network architecture. The network architecture comprises a CN and a BM-SC. The CN comprises an AUSF, a NEF and a policy control function (PCF). The AUSF and the NEF are communicatively connected via a NG AUSF-NEF interface. The NEF and the PCF are communicatively connected via a NG PCF-NEF interface. The BM-SC comprises a membership function and a security function. The membership function is communicatively connected to the NEF via a NG MBMS-NEF interface. The membership function is also communicatively connected to the PCF via an NG5 interface. The security function is communicatively connected to the NEF via a NG MBMS-NEF interface.

In accordance with embodiments of the present invention, there is also provided a network architecture. The network architecture comprises a BM-SC and a CN. The BM-SC comprises a proxy and transport function, a service announcement function, and a session and transmission function. The session and transmission function is communicatively connected to each of the proxy and transport function and the service announcement function. The CN comprises a user plane function (UPF) that is communicatively connected to the proxy and transport function via a first NG6-MBMS interface. The UPF is also communicatively connected to the service announcement function via a second NG6-MBMS interface. A multicast and broadcast multimedia subsystem (MBMS) transmission received at the session and transmission function is forwarded to the proxy and transport function. The MBMS transmission is then forwarded over the NG6-MBMS interface to the UPF. The MBMS transmission is then forwarded to an access node (AN) over a NG3-MBMS interface.

In accordance with embodiments of the present invention, there is also provided a method of providing access to a MBMS transmission. The method comprises an AUSF on a CN receiving a security code from a MBMS security function of a BM-SC and sending the security code to a requesting user equipment (UE). The AUSF receives the security code from a NEF via a NG AUSF-NEF interface. The NEF received the security code from the MBMS security function via a NG MBMS-NEF interface.

In accordance with embodiments of the present invention, there is also provided a method of transmitting a secured MBMS transmission. The method comprises an AUSF sending to a user plane function (UPF) a first security code, and sending to the UPF a second security code. The first security code is for decrypting a UE-requested MBMS transmission received at the UPF via a NG6-MBMS interface. The second security code is for encrypting the MBMS transmission to be sent to an AN over an N3-MBMS interface. The UE is connected to the AN.

An aspect of the disclosure provides a method of providing content from a content provider to a plurality of User Equipment (UE)s using at least one of a multicast and broadcast data transmission. Such a method includes receiving, by an authentication server function (AUSF) of a core network (CN), a request for an authenticated UE to access the content directed to the plurality of UEs. The method further includes receiving, by the AUSF of the CN, security information comprising a decryption code from a security function which provides the decryption code for use by the authenticated UE to decrypt the content. The method further includes sending, by the AUSF of the CN, the decryption code towards the authenticated UE. In some embodiments, sending the decryption code towards the authenticated UE includes sending the decryption code to an access and mobility management function (AMF) for forwarding to the authenticated UE. In some embodiments, sending, by the AUSF of the CN, the decryption code towards the authenticated UE includes sending, by the AUSF of the CN, the decryption code to a Session Management Function (SMF) for forwarding to the authenticated UE via an access and mobility management function (AMF). In some embodiments, the method further includes sending, by the AUSF of the CN, to a Session Management Function (SMF) a second decryption code for use by a User Plane Function (UPF) in decrypting content received by the UPF from the content provider, the received content directed to the plurality of UEs; and sending to the SMF a first security code for use by the UPF in encrypting the requested content for forwarding towards the plurality of UEs, the first security code corresponding to the decryption code. In some embodiments, the security function is at least one of: instantiated as a core network function with security data stored within the core network but supplied by the content provider; and located external to the core network. In some embodiments, the security information is received via another core network function.

Another aspect of the disclosure provides a method of establishing a session for providing content to a plurality of User Equipment (UE)s using at least one of a multicast and broadcast data transmission. Such a method includes receiving, by a Session Management Function (SMF) of a core network (CN), a request for an authenticated UE to access the content directed to the plurality of UEs. The method further includes requesting, by the SMF of the CN, authorization from a unified data management (UDM) function of the CN which is configured to receive membership information from a membership function. Such a method further includes initiating, by the SMF of the CN, the transmission of a decryption code towards the UE. In some embodiments, the membership function is at least one of: instantiated as a core network function with the membership information stored within the core network but supplied by the content provider; and located external to the core network. In some embodiments, the membership information is received via another core network function. In some embodiments, the method further includes after receiving the request, forwarding, by the SMF of the CN, the request to an authentication server function (AUSF) of a core network (CN) to authenticate the UE. In some embodiments, initiating, by the SMF of the CN, the transmission of a decryption code towards the UE includes at least one of: transmitting, by the SMF of the CN, a previously stored decryption code towards the UE; and requesting, by the SMF of the CN, the decryption code from an authentication server function (AUSF) of a core network (CN).

Another aspect of the disclosure provides a method of providing content from a content provider to a plurality of UEs, the method executed by a user plane function (UPF) of a core network (CN). Such a method includes receiving, by the UPF of the CN, content provided from the content provider to the plurality of UEs, storing, by the UPF of the CN, the content in a cache function; receiving an encryption code from an authentication server function (AUSF). Such a method further includes receiving the content from a cache function. Such a method further includes encrypting the received content using the encryption code to produce encrypted content; and transmitting the encrypted content towards the plurality of UEs via at least one Radio Access Network (RAN) node. In some embodiments, the transmitting the encrypted content includes multicasting the encrypted content to each of the at least one RAN node. In some embodiments, the transmitting the encrypted content includes broadcasting the encrypted content to each of the at least one RAN node. In some embodiments, the cache function is a core network cache function. In some embodiments, the UPF is configured to support multicast and broadcast data distribution to multiple (R)AN nodes and receiving the content from a cache function includes receiving the content over an interface. In some embodiments, transmitting the encrypted content towards the plurality of UEs includes transmitting the encrypted content using an interface.

Another aspect of the disclosure provides an authentication server function (AUSF) of a core network (CN) for providing content from a content provider to a plurality of User Equipment (UE)s using at least one of a multicast and broadcast data transmission, the AUSF configured to implement any of the methods steps described herein. For example, such an aspect provides an authentication server function (AUSF) of a core network (CN) for providing content from a content provider to a plurality of User Equipment (UE)s using at least one of a multicast and broadcast data transmission, the AUSF including a network interface; a processor; and a non-transitory machine readable medium. The machine readable medium stores machine executable instructions which when executed by the processor cause the AUSF to: receive a request for an authenticated UE to access the content directed to the plurality of UEs; receive security information comprising a decryption code from a security function which provides the decryption code for use by the authenticated UE to decrypt the content; and send the decryption code towards the authenticated UE.

It should be appreciated that in some embodiments the machine readable medium stores further instructions for implementing the method steps disclosed herein.

Another aspect of the disclosure provides a user plane function (UPF) of a core network (CN) for providing content from a content provider to a plurality of User Equipment (UE)s using at least one of a multicast and broadcast data transmission, the UPF configured to implement any of the methods steps described herein. For example, such an aspect provides a user plane function (UPF) of a core network (CN) for providing content from a content provider to a plurality of User Equipment (UE)s using at least one of a multicast and broadcast data transmission, the UPF including a network interface; a processor; and a non-transitory machine readable medium. The machine readable medium stores machine executable instructions which when executed by the processor cause the UPF to: store the content provided from the content provider in a cache function; receive an encryption code from an authentication server function (AUSF) of the core network; receive the content from the cache function; encrypt the received content using the encryption code to produce encrypted content; and transmitting the encrypted content towards the plurality of UEs via at least one Radio Access Network (RAN) node.

It should be appreciated that in some embodiments the machine readable medium stores further instructions for implementing the method steps disclosed herein.

Another aspect of the disclosure provides a Session Management Function (SMF) of a core network (CN) for establishing a session for providing content from a content provider to a plurality of User Equipment (UE)s using at least one of a multicast and broadcast data transmission, the SMF configured to implement any of the methods steps described herein. For example, such an aspect provides a Session Management Function (SMF) of a core network (CN) for establishing a session for providing content from a content provider to a plurality of User Equipment (UE)s using at least one of a multicast and broadcast data transmission, the SMF including a network interface; a processor; and a non-transitory machine readable medium. The machine readable medium stores machine executable instructions which when executed by the processor cause the SMF to: receive a request for an authenticated UE to access the content directed to the plurality of UEs; request authorization from a unified data management (UDM) function of the CN which is configured to receive membership information from a membership function; and initiate, by the SMF of the CN, the transmission of a decryption code towards the UE.

It should be appreciated that in some embodiments the machine readable medium stores further instructions for implementing the method steps disclosed herein.

BRIEF DESCRIPTION OF THE FIGURES

Further features and advantages of the present invention will become apparent from the following detailed description, taken in combination with the appended drawings, in which:

FIG. 9 illustrates, in a flowchart, an example of a method of providing access to a MBMS transmission, in accordance with examples of the network architecture;

It will be noted that throughout the appended drawings, like features are identified by like reference numerals.

DETAILED DESCRIPTION

Embodiments of the present invention are directed towards network architectures having multicast and broadcast multimedia subsystem (MBMS) capabilities.

Figure 1:
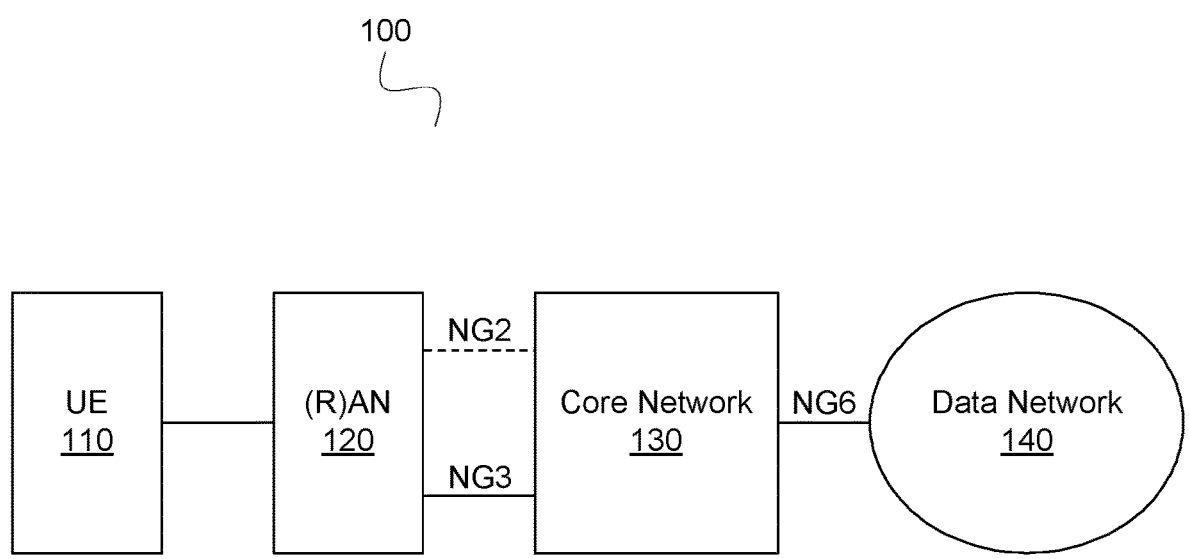
FIG. 1 illustrates, in a component diagram, an example of a communication network architecture.

FIG. 1 illustrates, in a component diagram, an example of a communication network architecture 100. The communication network architecture 100 comprises a user equipment (UE) 110, an access network (AN) 120, a core network (CN) 130 and a data network (DN) 140. The AN 120 may be a radio access network (RAN). The term "(R)AN" in this disclosure denotes that an AN may be a RAN. The UE 110 communicates with a DN 140 via the (R)AN 120 and CN 130. Messaging packet data units (PDUs) sent between the UE 110 and the DN 140 pass through the (R)AN 120 and the CN 130. A DN 140 may be a public network operator, a private data network such as local area data network (LADN), an intra-operator data network, or any other type of data network.

In an uplink (UL) direction, user plane (UP) and control plane (CP) PDUs pass from the UE 110 to the (R)AN 120 via a communication link. The (R)AN 120 then forwards the UP and CP PDUs to the CN 130 that then forwards the UP PDUs to the DN 140. In a downlink (DL) direction, UP PDUs pass from the DN 140 to the CN 130. The CN 130 then forwards the UP PDUs, and may send CP PDUs, to the (R)AN 120 that then forwards the UP and CP PDUs to the UE 110. CP functionality on the CN 130 configures UP functions on the CN 130 to provide traffic handling functionality for a session. One or more UP functions per session may be activated and configured by the CP functionality for a given UP scenario.

The connections between the components of the communication network architecture 100 may be suitable for any communication channel. For next generation (NG) architectures, such as fifth generation (5G) mobile wireless networks, the connection between the UE 110 and a (R)AN 120 may be a wireless connection. The connection between the (R)AN 120 and the CP of the CN 130 may be via an NG2 interface. The connection between the (R)AN 120 and the UP of the CN 130 may be via an NG3 interface. The connection between the UP of the CN 130 and the DN 140 may be via an NG6 interface.

Figure 2:
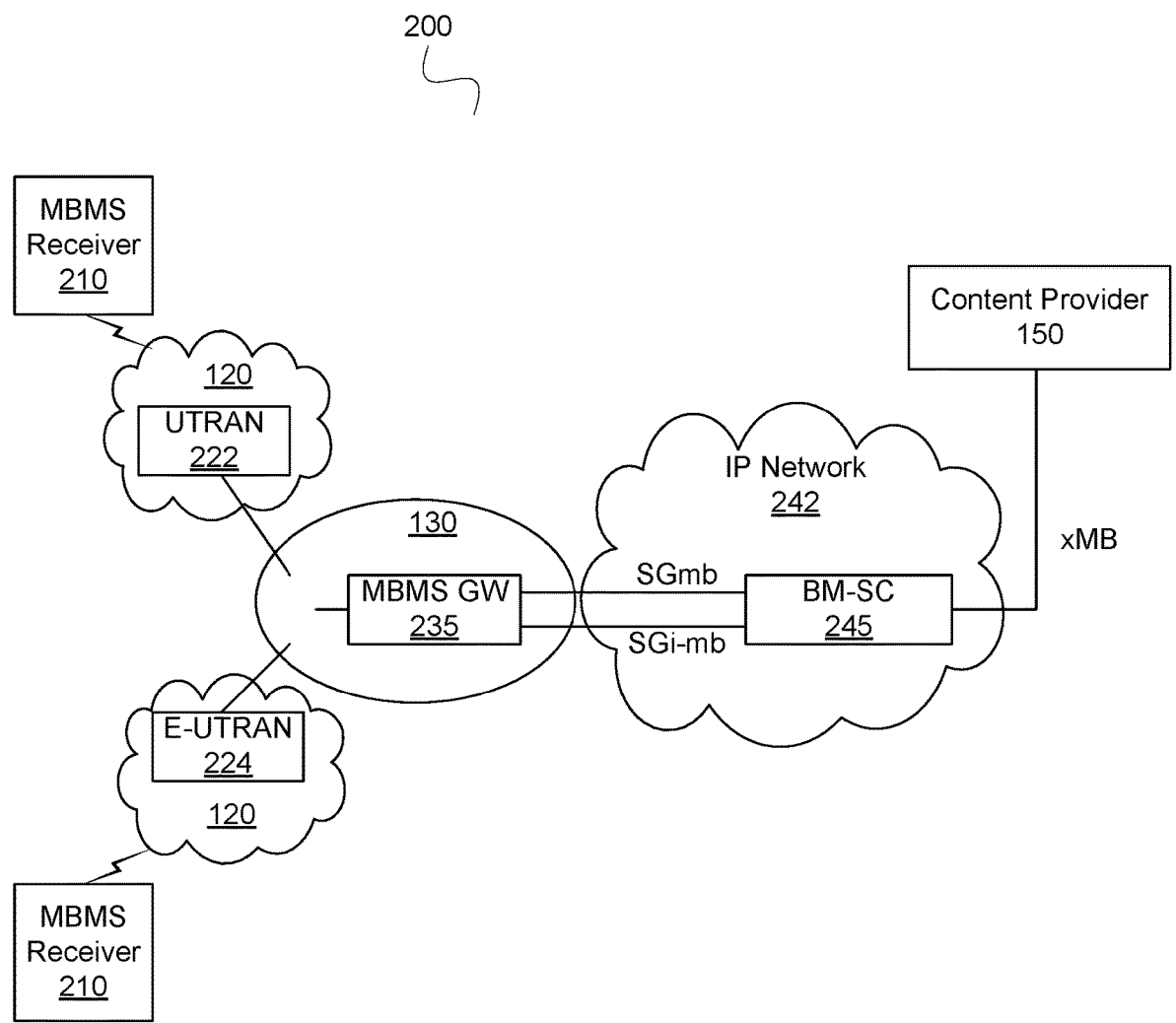
FIG. 2 illustrates, in a component diagram, an example of a multicast and broadcast multimedia subsystem (MBMS) architecture for evolved packet system (EPS)

FIG. 2 illustrates, in a component diagram, an example of a multicast and broadcast multimedia subsystem (MBMS) architecture 200 for an evolved packet system (EPS). The MBMS architecture 200 comprises at least one UE 110 (in this example, MBMS receivers 210), at least one (R)AN 120 (in this example, a universal terrestrial radio access network (UTRAN) 222 and an evolved UTRAN (E-UTRAN) 224 are implemented in separate RANs 120), a CN 130, at least one DN 140 (in this example, an Internet protocol (IP) network 242 is implemented as the DN 140), and a content provider 150. It is noted that sometimes the term UTRAN is defined as "universal mobile telecommunications service (UMTS) terrestrial radio access network". Regardless of the full name used for UTRAN, both names refer to the same UTRAN.

The MBMS receivers 210 may receive wireless signals from the (R)AN 120 (UTRAN 222 or E-UTRAN 224) to which they are connected. The RANs 120 are also connected to the CN 130 via a backbone connection. The CN 130 includes an MBMS gateway (MBMS GW) 235. The DN 140 (IP network 242) includes a broadcast-multicast-service centre (BM-SC) 245. The BM-SC 245 may be a mobile edge computing (MEC) application. The CN 130 is connected to the DN 140 via SGmb and SGi-mb interfaces between the MBMS GW 135 and the BM-SC 245. A content provider 150 may be connected to the BM-SC 245 via a xMB interface.

Figure 3:
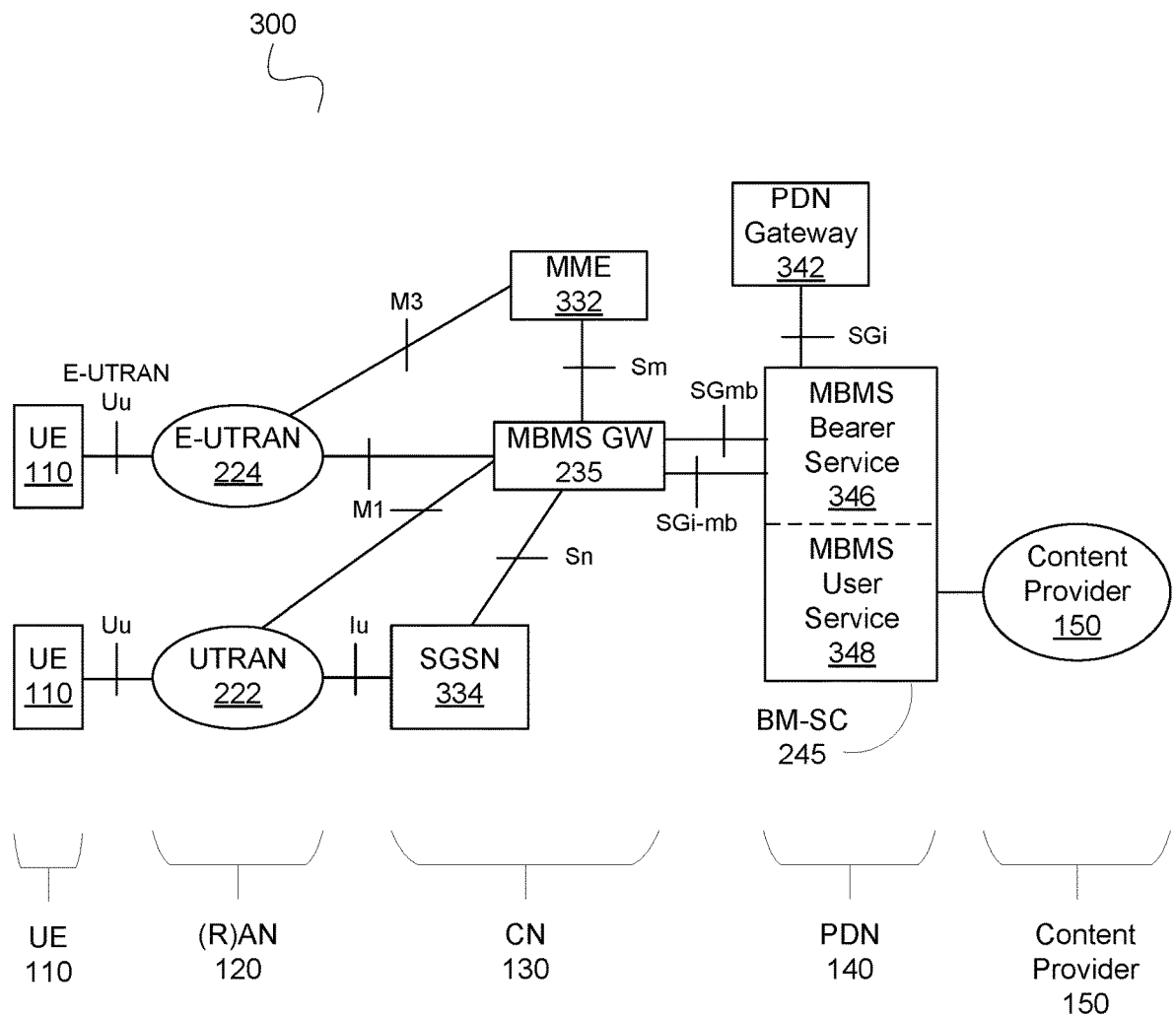
FIG. 3 illustrates, in a component diagram, an example of a reference architecture for evolved packet system with evolved universal terrestrial radio access network (E-UTRAN) and UTRAN in MBMS broadcast mode.

FIG. 3 illustrates, in a component diagram, an example of a reference architecture 300 for an evolved packet system with E-UTRAN and UTRAN in MBMS broadcast mode.

The reference architecture 300 includes at least one user equipment (UE) 110, at least one (R)AN (in this example, a UTRAN 222 and an E-UTRAN 224), a mobility management entity (MME) 332 of a CN 130, a serving general packet radio service (GPRS) support node (SGSN) 334 of a CN 130, a MBMS GW 235 of a CN 130, a DN gateway 342 of a DN 140, the BM-SC 245 of a DN 140, and the content provider 150. The UEs 110 may wirelessly communicate with the (R)ANs 120 via a Uu interface for the UTRAN 222 and via a E-UTRAN Uu interface for the E-UTRAN 224. The UTRAN 222 may communicate with the MBMS GW 235 via an M1 interface to send and receive data packets, and with the SGSN 334 via a Iu interface to send and receive control packets. The SGSN 334 may communicate with the MBMS GW 235 via a Sn interface to send and receive control packets. The E-UTRAN 224 may communicate with the MME 332 via an M3 interface to send and receive control packets, and with the MBMS GW 235 via an M1 interface to send and receive data packets. The MME 332 may communicate with the MBMS GW 235 via an Sm interface to send and receive control packets. The BM-SC 245 supports separate unicast (via a SGi interface) and multicast/broadcast (via a SGi-mb interface) transmissions or sessions. The BM-SC 245 comprises a MBMS bearer service 346 for data distribution from BM-SC 245 to the UEs 110, and a MBMS user service 348 for managing UE subscription, charging and security information. The MBMS GW 235 may communicate with the MBMS bearer service 348 via the SGmb interface for unicast transmissions and via the SGi-mb interface for multicast/broadcast transmissions. The DN gateway 342 may communicate with the MBMS bearer service 348 via the SGi interface. The content provider 150 may communicate with the BM-SC via a suitable data connection. It should be appreciated the PDN 342 can establish unicast bearers to send data from BM-SC 245 to multiple UEs 110.

It is noted that FIG. 3 illustrates a 4G network in which the components, e.g., MME 332, MBMS GW 235, BM-SC 245, etc., represent dedicated hardware components (e.g., network elements) of the network. It is envisaged that 5G networks will provide more flexible architectures, allowing for various network functions to reside in flexibly configured hardware components using network function virtualization (NFV). It is also envisaged that 5G networks will provide flexible virtual networks (VNs) and the allocation of resources to services or VNs by means of network slicing. Accordingly, embodiments discussed herein propose systems, architectures and methods of providing MBMS capabilities in 5G networks.

Several examples of network architectures having MBMS capabilities will now be described with reference to FIGS. 4 through 8. It should be noted that some components in each figure and example may be the same component (and are shown in the figures with the same reference numeral). Wherever a description of any of those same components and their functions are not repeated for one example, then it should be understood that a description in another example for that same component applies.

Figure 4:
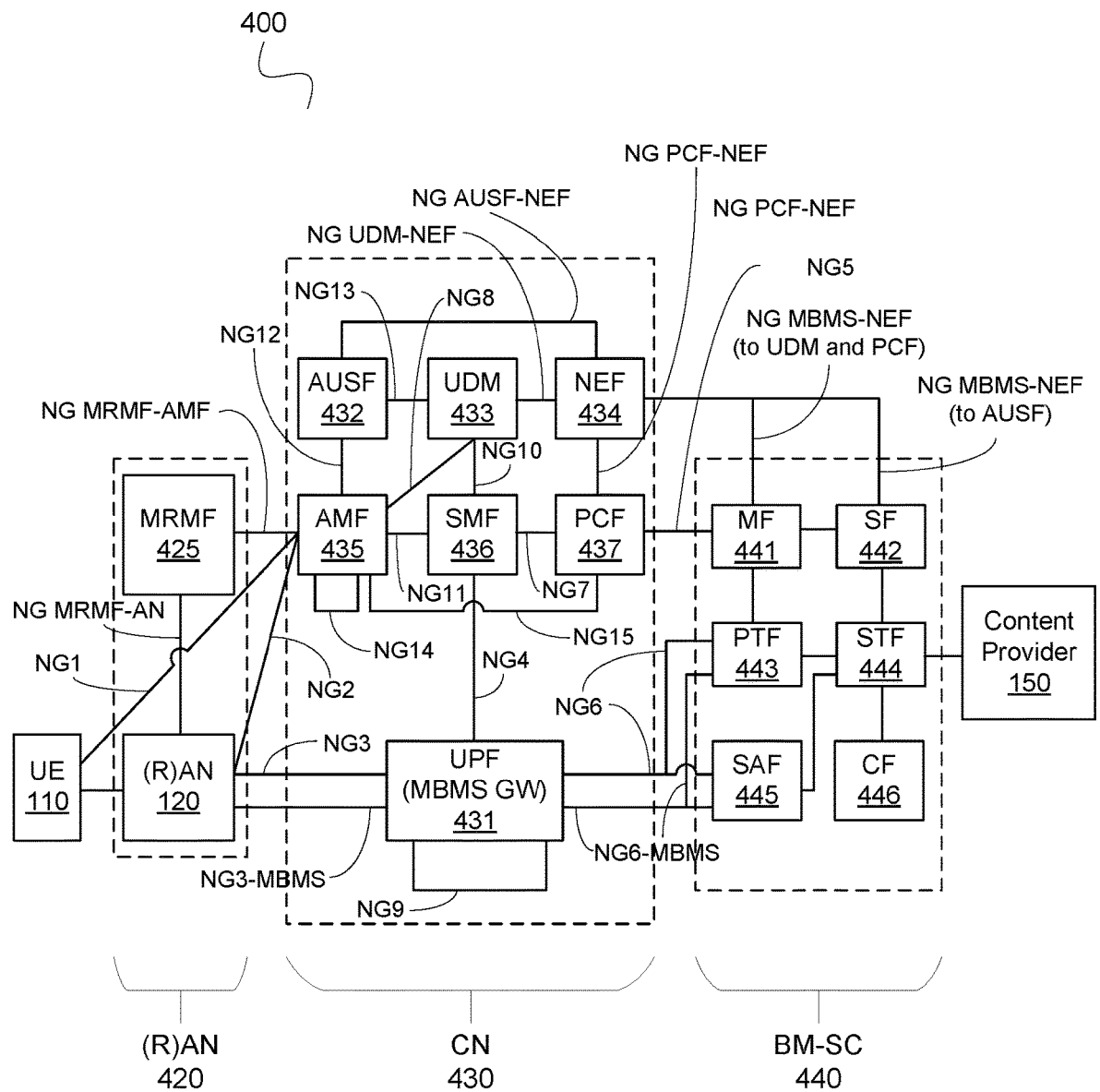
FIG. 4 illustrates, in a component diagram, an example of a network architecture having MBMS capabilities, in accordance with an embodiment of the present disclosure.

FIG. 4 illustrates, in a component diagram, an example of a network architecture 400 having MBMS capabilities, in accordance with an embodiment of the present disclosure. The network architecture 400 may be a fifth generation (5G) network architecture and comprises a (R)AN sub-architecture 420, a CN sub-architecture 430 and a BM-SC sub-architecture 440.

The (R)AN sub-architecture 420 comprises at least one UE 110, at least one (R)AN 120 and a MBMS RAN management function (MRMF) 425. A UE 110 may communicate with a (R)AN 120 via a suitable wired or wireless connection. The MRMF 425 may communicate with a (R)AN 120 via a NG MRMF-AN interface. The MRMF 425 may manage multicast and/or broadcast data transmissions for multiple RANs 120. Note that the unicast data transmission may be a special case of multicast data transmission, where only one UE 110 joins the multicast data transmission; some data transmission parameters of multicast session may be modified to serve a single UE 110 or simply an existing unicast radio bearer is used for unicast data transmission.

The CN sub-architecture 430 comprises a user plane function (UPF) 431 that comprises the MBMS GW 235 or supports equivalent functionalities of MBMS GW 235, an authentication server function (AUSF) 432, a unified data management (UDM) function 433, a network exposure function (NEF) 434, an access and mobility management function (AMF) 435, a session management function (SMF) 436 and a policy control function (PCF) 437. The AUSF 432 provides security functions, such as authenticating the users and users' requests, and security keys used for the encryption and decryption of data transmitted over the interfaces, such as interfaces between the UE 110 and the UPF 431. The UDM 433 provides storage management for the network and user information, and security measures to protect the data. The NEF 434 provides connections for MBMS control functions and the CN control plane functions (CPF) via a NG MBMS-NEF interface. The AMF 435 handles the termination of signalling interfaces NG1 and NG2, handles the forwarding of signalling messages from a UE 110 and a (R)AN 120 to the SMF 436, and handles mobility and security procedures for UEs 110. The SMF 436 handles UP connection establishment between a UE 110 and a DN 140. The PCF 437 provides policies to different network functions to handle a UE session. Such policies include quality of service (QoS), mobility management, session management and charging policies. Table 1 shows the interfaces that connect some of the components of the CN sub-architecture 330 with other components of the CN sub-architecture 330.

TABLE 1

Communication Interfaces between CN Components

| Component | Interface | Component |
|---|---|---|
| AUSF 432 | NG13 | UDM 433 |
| AUSF 432 | NG12 | AMF 435 |
| AUSF 432 | NG AUSF-NEF | NEF 434 |
| UDM 433 | NG UDM-NEF | NEF 434 |
| UDM 433 | NG8 | AMF 435 |
| UDM 433 | NG10 | SMF 436 |
| NEF 434 | NG PCF-NEF | PCF 437 |
| AMF 435 | NG14 | AMF 435 |
| AMF 435 | NG11 | SMF 436 |
| AMF 435 | NG15 | PCF 437 |
| SMF 436 | NG7 | PCF 437 |
| SMF 436 | NG4 | UPF (MBMS GW) 431 |
| UPF (MBMB GW) 431 | NG9 | UPF (MBMS GW) 431 |

Although the above point-to-point interfaces connecting two network functions are described, service-based interfaces (SBI) can be also be used, for example, as described in 3GPP Technical Standard TS 23.502 entitled "Procedures for the 5G System". For example, in a service based view, AMF 435 can communicate with other core network control plane functions through a service based interface denoted as Namf (not shown). The SMF 436 can communicate with other core network functions, in a service based view, through a service based interface denoted as Nsmf. The SMF 436 may also connect to a UPF 212 through a logical interface such as network interface NG4. As another example, the Authentication Server Function (AUSF) 432, provides authentication services to other network functions over a service based Nausf interface.

In the (R)AN sub-architecture 420, the MRMF 425 may perform the selection of a suitable radio bearer in the 5G radio access node (gNB) (for example, selection of a unicast, a single-cell point-to-multipoint (SC-PTM) or a broadcast radio channel). The MRMF 425 may also coordinate the broadcast resources of multiple radio nodes for the same MBMS service. A NG MRMF-AMF interface connects the MRMF 425 and the CN 130. In particular, the MRMF 425 may communicate with the AMF 424 via the NG MRMF-AMF interface. The SMF 436 may send to the MRMF 425, via the AMF 424, information pertaining to the UEs 110 that are accessing the MBMS services. The UE 110 may communicate with the AMF 424 via an NG1 interface.

A (R)AN 120 mode may communicate unicast CP packets with the AMF 324 via an NG2 interface. An NG MRMF-AN interface conveys MBMS control information between the MRMF 425 and the (R)AN 120 nodes. The MRMF 425 may send to the (R)AN 120 nodes the type of radio channels for DL MBMS transmissions (e.g., unicast, SC-PTM or broadcast radio channel), and broadcast resource allocation (e.g., carrier frequency, resource block number, etc.). The (R)AN 120 nodes may send to the MRMF 425 radio resource availability, including which resources are in use, for the MRMF to make the radio bearer selection. The (R)AN 120 nodes receive unicast DL data (UP packets and/or sessions) from the UPF 431 via a NG3 interface, and receive MBMS DL multicast data (DL packets and/or sessions) transferred from the MBMS GW 235 implemented in the UPF 431 via a NG3-MBMS interface. It is noted that while in this example the MBMS GW 235 is implemented in the UPF 431, the MBMS GW function alone may be one type of UPF 431. Also, a MBMS GW may be co-located with a UPF 431 or an integral part of the UPF 431. It should be appreciated that in some embodiments, the MGMS-GW of FIGS. 4-8 can be integrated into UPF 431 by adding software functionalities performing functionalities of MBMS GW 235.

The BM-SC sub-architecture 440 may be implemented in a DN 140 node and comprises a membership function (MF) 441, a security function (SF) 442, a proxy and transport function (PTF) 443, a session and transmission function (STF) 444, a service announcement function (SAF) 445 and a cache function (CF) 446. A NG5 interface may communicate QoS information and other information between the MF 441 and the PCF 437. The MF 441 may also communicate with the PTF 443. The SF 442 may communicate with the STF 444. The PTF 443 may also communicate with the STF 444. The STF 444 may also communicate with the SAF 445 and with the CF 446. The CF 446 may comprise cache for content received from a content provider 150 and/or cache for content that was sent for transmission. The SF generates security codes for an end-to-end connection, from the application server in the DN to the UPF, and from the UPF to the UE.

As noted above, the NEF 434 provides connections for MBMS control functions and the CN CPF via the NG NEF-MBMS interface. The MBMS SF 442 performs security procedures with the CN AUSF 432. When a UE 110 performs a network attach procedure, the UE 110 and the AUSF 432 also perform bi-lateral authentication. After successful authentication, the AUSF 432 sends to the UE 110 security keys for data encryption in the uplink and data decryption in the downlink. During, or after, the completion of the network attach procedure, the UE 110 may request an MBMS service. The AUSF 432 plays the role of a middle point to transfer security messages between the UE 110 and the MBMS security function 442. The MBMS SF 442 sends to the UE 110 the security code to encrypt or decrypt the data in the UP. The MBMS SF 442 can provide authentication service to verify the UE identity.

It is understood that the NG1 interface is used to transfer CP information between the UE 110 and CP functions of CN 430. Hence a person skilled in the art can realize that one way to deliver the security from the AUSF 432 to the UE 110 is either via the AMF 435, or via SMF 436 and the AMF 435.

The MBMS membership function 441 manages, communicates with, and sends UE 110 membership data (for example, subscription data, QoS policy and MBMS content access server locations) over a NG MBMS-NEF interface to the NEF 434 UE 110. The NEF 434 sends the UDM 433 subscription data (i.e., to ensure the UE 110 has a subscription) received from the MBMS MF 441. The NEF 434 sends to the PCF 437 QoS policy and MBMS server locations for content access received from the MBMS MF 441. Alternatively, when the UE 110 sends request for a MBMS service to the SMF 436, the SMF 436 can contact the MF 441 of BM-SC 440 to get service authorization. In some embodiments, the SMF 436 may communicate with the MF 441 using an SBI. Alternatively, the SMF 436 may communicate with the MF 441 via a user plane (UP) interface. For example, the SMF 426 may send the authorization request message to the same or different UPF 431, which may or may not have MBMS GW functionalities. This UPF 431 forwards the authorization request message to the MF 441 either directly or indirectly via another function of BM-SC 440, such as the PTF 443.

In some embodiments, the interfaces, such as NG MBMS-NEF, may be implemented using an SBI interface. This may allow a direct communication between a function of the CN 430 and a function of BM-SC 440. For example, the SF 442 of BM-SC 440 may provide a service that provides encryption and decryption keys for content protection. The consumer functions, such as AUSF 432 or SMF 436, may obtain the encryption and decryption keys from the SF 442 by using the service of SF 442. Similarly, the MF 441 may provide a UE Subscription Service. The consumer functions, such as UDM 433 or SMF 436, or PCF 437, may get the UE subscription of MBMS services by using UE Subscription Service of the MF 441.

In some embodiments, the PTF 443 may be configured to use SBI provided by functions of CN 430. For example, the PTF 443 may send request to CN 430 to establish UP connections. The request from the PTF 443 may be sent to PCF 437, or NEF 434 using SBI of PCF 437 or NEF 434 respectively. The PTF 443 may send information of MBMS session, which may include the location information of MBMS session (for example Geographical Zone Identifiers), time information (start time, end time, or length/duration of MBMS session), UE information (UE IDs, such as External Identifiers, UE group information (such as External Group Identifier), UE Categories, Device Class), QoS information (such as Maximum Bit Rate, Resource type (for example, GBR, non-GBR, delay critical GBR), Maximum Flow Bit Rate, Guaranteed Flow Bit Rate, Packet Delay Budget, Packet Error Rate), Application layer protocol information (e.g. Dynamic Adaptive Streaming over HTTP (DASH)) which may be used by the CN functions to optimize operation, and/or may be sent to the UEs 110.

In some embodiments, messages between a function of the CN 430 and a function of BM-SC 440 may be exchanged via the NEF 434 using SBI interface. This would help to provide protection of CN 430 against electronic attacks.

The MBMS PTF 443 and the SAF 445 are connected with the UPF 431 (MBMS GW 235) via NG6 interfaces for unicast content data, and via NG6-MBMS interfaces for broadcast content and control information for content processing in the UPF. For example, the UPF 431 may perform the function of a dynamic adaptive streaming over hypertext transfer protocol (HTTP) (DASH) client to retrieve video segments from the DASH server of a content provider 150. The NG6-MBMS interface allows for a single encryption code to be used with the CN 130 for all multicasts and broadcasts, which include unicast as a special case.

Figure 5:
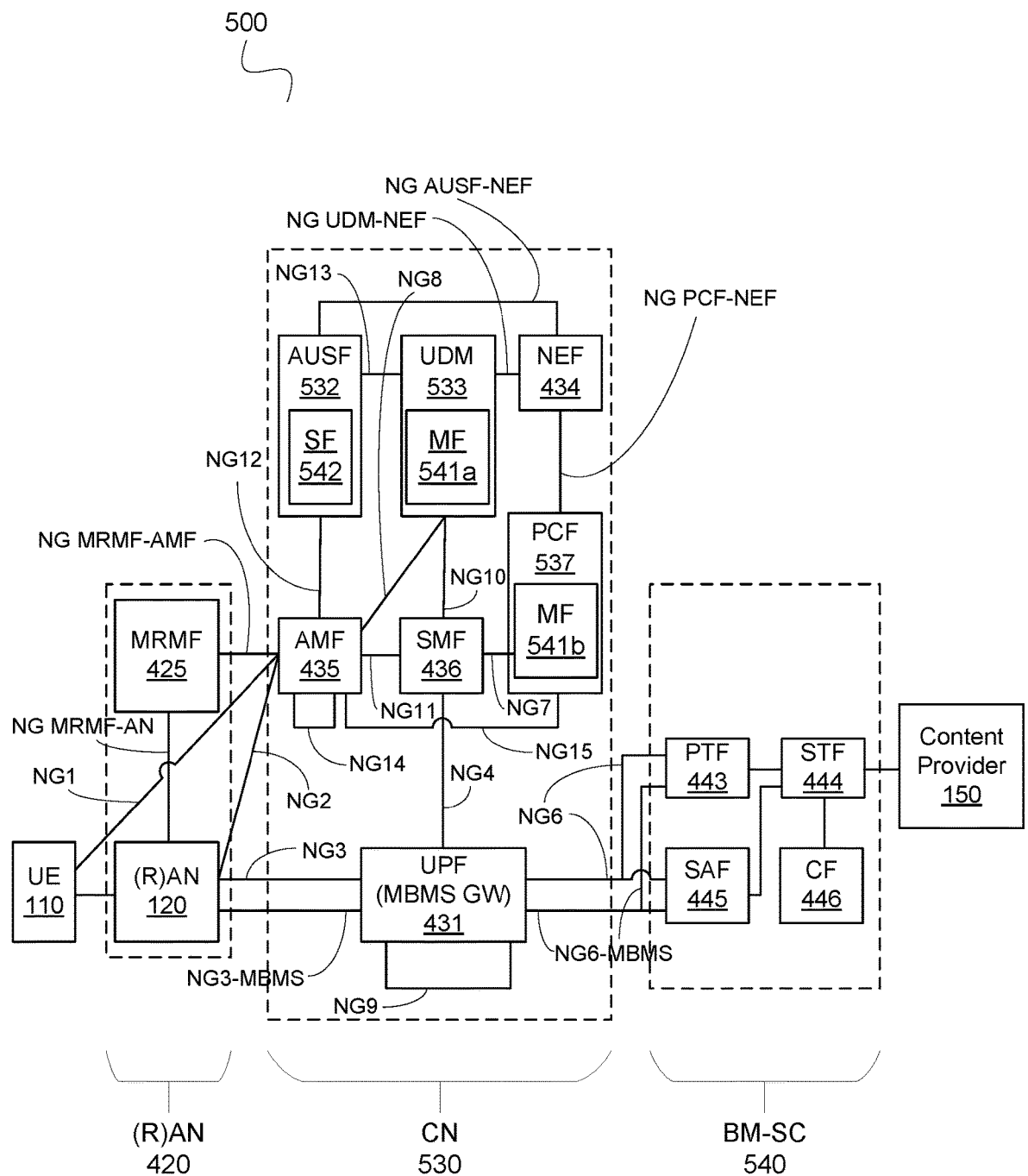
FIG. 5 illustrates, in a component diagram, a second example of a network architecture having MBMS capabilities, in accordance with an embodiment of the present disclosure.

FIG. 5 illustrates, in a component diagram, a second example of a network architecture 500 having MBMS capabilities, in accordance with an embodiment of the present disclosure. The network architecture 500 may be a 5G network architecture and comprises the (R)AN sub-architecture 420, a CN sub-architecture 530 and a BM-SC sub-architecture 540. This second example of a network architecture 500 integrates some MBMS control functions into the CN CPF, thus simplifying the BM-SC 540 architecture which may reduce the cost of a MBMS system. Furthermore, the service setup delay, and the number of signaling messages, are reduced. In this architecture 500, the MBMS data processing functions remain outside the CN an in the BM-SC 540 of the DN 140. The (R)AN sub-architecture 420 remains as described in FIG. 4.

The MBMS security function (SF) 542 is integrated with the AUSF 532. A first part of the membership function (MF) 541*a* that manages the subscription data (including to which services the UE 110 has a subscription) is merged with the UDM 533. A second part of the membership function (MF) 541*b* that manages the QoS policy, and the MBMS server locations for content access, is merged with the PCF 537.

The MBMS PTF 443, and the SAF 445 are connected with the UPF (MBMS-GW) 431 via NG6 interfaces for unicast data, and via NG6-MBMS interfaces for multicast or broadcast data. Content data delivered from the PTF 443 of the BM-SC 540 to the UPF 431 may be encrypted at the BM-SC 540. Then the UPF 431 may decrypt the content data to perform in-network processing, such as video transcoding. Thus a single encryption scheme for each UPF 431 may be used to encrypt data transmitted between the BM-SC 540 and the UPF 431. The UPF 431 may also request user information, such as encryption keys, from the CN CPFs in order to encrypt the content data again for secured transmission over the air interface. Program information delivered from the SAF 445 of the BM-SC 540 to the UPF 431 may also be handled the same way as described above for the content data. It is noted that there are two ways to send program information towards the UE 110. One way is to broadcast (or multicast) via the NG6-MBMS interface. The other way is a unicast transmission via the NG6 interface, where the UE 110 can access the SAF server to download the program information. It is noted that in some embodiments the UPF 431 can use another interface in transmitting data towards UE 110 via the (R)AN 12. For example if the UPF 431 received broadcast (or multicast) data via the NG6-MBMS interface, than it can transmit broadcast (or multicast) data via the NG3-MBMS interface, and similarly use the NG3 interface for unicast data received via the NG6 interface. However, some embodiments can change the interface if the circumstances warrant. For example if multiple UPFs are instantiated to serve individual UEs, than those UPFs may receive broadcast (or multicast) data via the NG6-MBMS interface directed to each of a plurality of UEs, but each UPF can be configured for unicast transmissions to the particular UE that that UPF serves.

Figure 6:
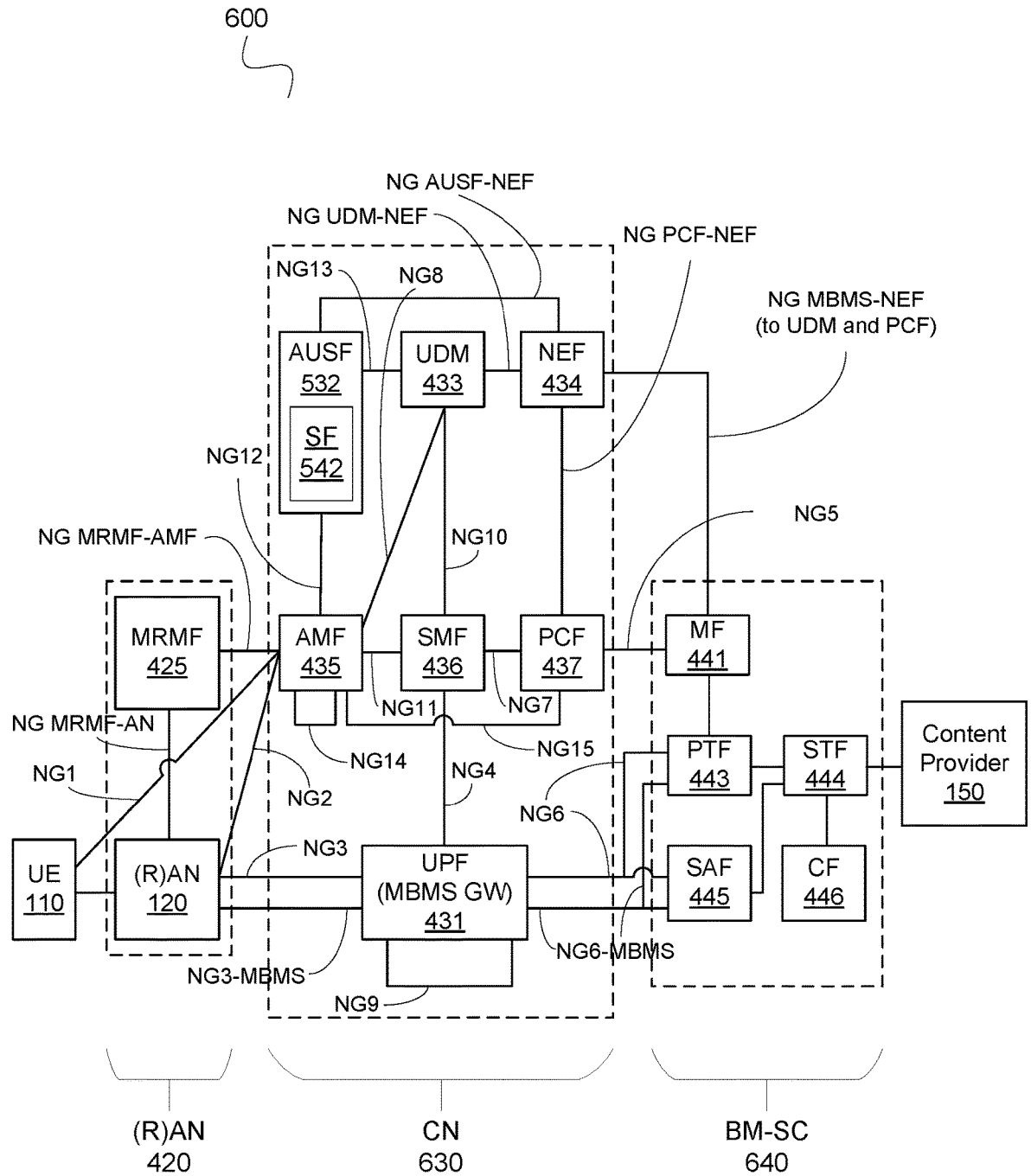
FIG. 6 illustrates, in a component diagram, a third example of a network architecture having MBMS capabilities, in accordance with an embodiment of the present disclosure.

FIG. 6 illustrates, in a component diagram, a third example of a network architecture 600 having MBMS capabilities, in accordance with an embodiment of the present disclosure. The network architecture 600 may be a 5G network architecture and comprises the (R)AN sub-architecture 420, a CN sub-architecture 630 and a BM-SC sub-architecture 640. The network architecture 600 integrates the MBMS security function (SF) 542 the CN AUSF 532, thus simplifying the BM-SC 640 architecture which may reduce the cost of an MBMS system. Furthermore, the service setup delay, and the number of security signaling messages, are reduced. In this architecture 600, the MBMS membership function (MF) 441 remains in the BM-SC 640, allowing for independent membership management in the BM-SC 640 of the DN 140. MBMS data processing functions also remain outside the CN in the BM-SC 640 of the DN 140. The (R)AN sub-architecture 420 remains as described in FIG. 4.

The MBMS proxy and transport function (PTF) 443, and the service announcement function (SAF) 445 are connected with the UPF (MBMS-GW) 431 via NG6 interfaces for unicast data, and via NG6-MBMS interfaces for multicast or broadcast data. Content data delivered from the PTF 443 of the BM-SC 640 to the UPF 431 may be encrypted at the BM-SC 640, for example by PTF 443. Then the UPF 431 may decrypt the content data to perform in-network processing, such as video transcoding. Thus a single encryption scheme for each UPF 431 may be used to encrypt data transmitted between the BM-SC 640 and the UPF 431. The UPF 431 may also request user information, such as encryption keys, from the CN CPFs in order to encrypt the content data again for secured transmission over the air interface. Program information delivered from the SAF 445 of the BM-SC 640 to the UPF 431 may also be handled the same way as described above for the content data. It is noted that there are two ways to send program information to the UE 110. One way is to broadcast (or multicast) via the NG6-MBMS interface. The other way is a unicast transmission via the NG6 interface, where the UE 110 can access the SAF server to download the program information. Transmitting data towards UE 110 via the (R)AN 12 that was received at the UPF from the BM-SC 40 is similar to description above.

Figure 7:
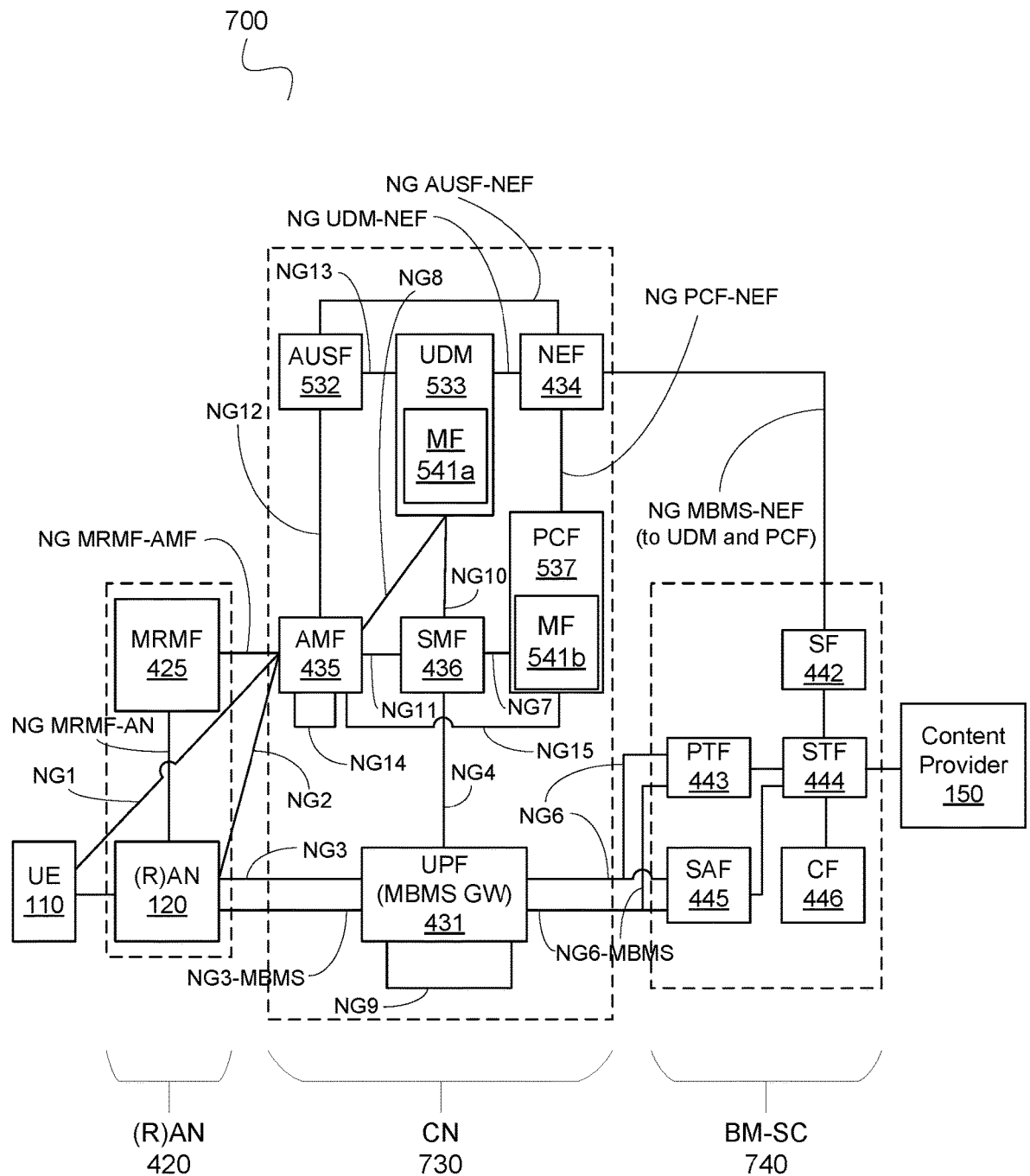
FIG. 7 illustrates, in a component diagram, a fourth example of a network architecture having MBMS capabilities, in accordance with an embodiment of the present disclosure.

FIG. 7 illustrates, in a component diagram, a fourth example of a network architecture 700 having MBMS capabilities, in accordance with an embodiment of the present disclosure. The network architecture 700 may be a 5G network architecture and comprises the (R)AN sub-architecture 420, a CN sub-architecture 730 and a BM-SC (AF) sub-architecture 740. The network architecture 700 integrates a first part of the MBMS membership function (MF) 541*a*, that manages the subscription data (including to which services the UE 110 has a subscription), with the UDM 533, and integrates a second part of the MBMS membership function (MF) 541*b*, that manages the QoS policy and the MBMS server locations for content access, with the PCF 534. Thus, the BM-SC 740 architecture is simplified which may reduce the cost of a MBMS system. Furthermore, the session establishment procedure may be simplified since the CN 130 does not need to verify user subscription with the BM-SC 740, and thus, the number of membership subscription signaling messages, are reduced. In this architecture 700, the MBMS security (SF) 442 remains in the BM-SC 740, allowing for independent third party security measures for content protection at the BM-SC 740 of the DN 140. MBMS data processing functions remain outside the CN an in the BM-SC 740 of the DN 140. The (R)AN sub-architecture 420 remains as described in FIG. 4.

The MBMS proxy and transport function (PTF) 443, and the service announcement function (SAF) 445 are connected with the UPF (MBMS-GW) 431 via NG6 interfaces for unicast data, and via NG6-MBMS interfaces for multicast or broadcast data. Content data delivered from the PTF 443 of the BM-SC 740 to the UPF 431 may be encrypted at the BM-SC 740. Then the UPF 431 may decrypt the content data to perform in-network processing, such as video transcoding. Thus a single encryption scheme for each UPF 431 may be used to encrypt data transmitted between the BM-SC 740 and the UPF 431. The UPF 431 may also request user information, such as encryption keys, from the CN CPFs in order to encrypt the content data again for secured transmission over the air interface. Program information delivered from the SAF 445 of the BM-SC 740 to the UPF 431 may also be handled the same way as described above for the content data. It is noted that there are two ways to send program information to the UE 110. One way is to broadcast (or multicast) via the NG6-MBMS interface. The other way is a unicast transmission via the NG6 interface, where the UE 110 can access the SAF server to download the program information. Transmitting data towards UE 110 via the (R)AN 12 that was received at the UPF from the BM-SC 40 is similar to description above.

Figure 8:
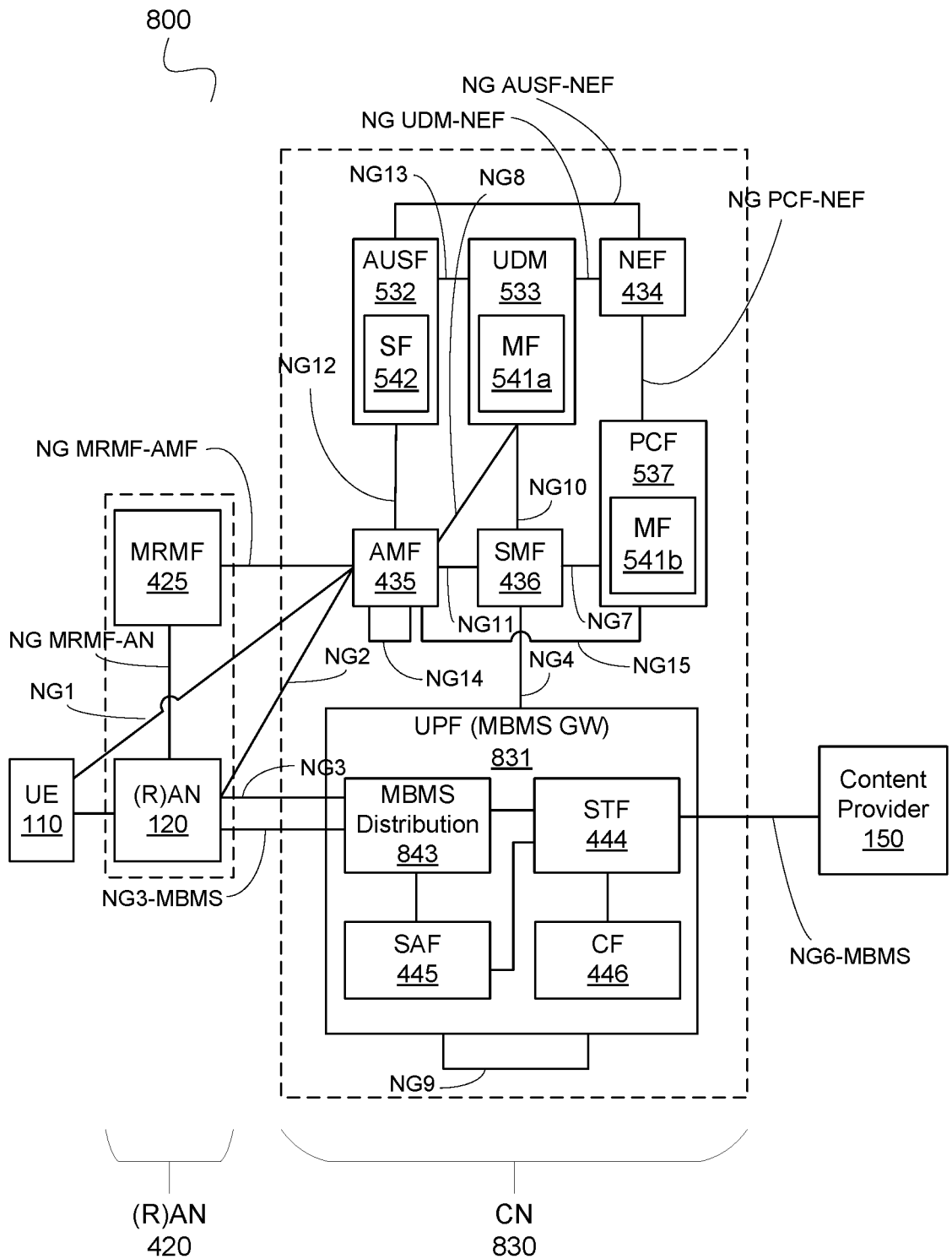
FIG. 8 illustrates, in a component diagram, a fifth example of a network architecture having MBMS capabilities, in accordance with an embodiment of the present disclosure.

FIG. 8 illustrates, in a component diagram, a fifth example of a network architecture 800 having MBMS capabilities, in accordance with an embodiment of the present disclosure. The network architecture 800 may be a 5G network architecture and comprises the (R)AN sub-architecture 420 and a CN sub-architecture 830. The network architecture 800 integrates the control functions of the BM-SC with the CN CPF, and the data processing functions of the BM-SC with the UPF 831, thus simplifying the BM-SC architecture which may reduce the cost of a MBMS system. Furthermore, the service setup delay, and the number of signaling messages, are reduced. The (R)AN sub-architecture 420 remains as described in FIG. 4.

The MBMS SF 542 is integrated with the AUSF 532. A first part of the membership function (MF) 541a that manages the subscription data (including to which services the UE 110 has a subscription) is merged with the UDM 533. A second part of the membership function (MF) 541b that manages the QoS policy, and the MBMS server locations for content access, is merged with the PCF 537.

The MBMS proxy and transport function is integrated with the UPF (MBMS GW) 831, allowing for localized MBMS services (for example, for vehicular communications where traffic updates are localized). The UPF (MBMS GW) 831 comprises four UP functions similar to those in a BM-SC: a MBMS distribution 843 entity, a STF 444, the SAF 445 and the CF 446. The MBMS distribution 843 entity performs multicast transmission with multiple (R)AN 120 nodes via the NG3-MBMS interface. The SMF 436 controls the multicast session setup between the UPF (MBMS GW) 831 and the (R)AN 120 nodes via NG4 and NG2 interfaces, respectively. A NG6-MBMS interface between the UPF (MBMS GW) 831 and a content provider 150 may carry content and in-band control messages.

Since the functions of BM-SC subsystem are integrated in CN 830, some functionalities of BM-SC functions may be performed by some functions of CN 830 as explained above. Another example of functionality integration is that the PTF 443 of BM-SC subsystem is implemented in MBMS Distribution function 843. The MBMS Distribution function 843 is a part of UPF 831; and it can generate charging records for Content Provider 150. The MBMS Distribution function may send the charging records to the PCF 537 via the SMF 436; the PCF 537 may send the charging record to the Content Provider 150 directly or via the NEF 434. Alternatively, the MBMS Distribution 843 may send charging records to the Content Provider 150 directly by using a separate interface. Alternatively, the MBMS Distribution 843 may send charging records to the Content Provider 150 via the STF 444.

From this disclosure, a person skilled in the art would understand that the multicast or broadcast data transmission could be established by CP functions. For example, the SMF may establish the UP connections between the UPF 431 and (R)AN 120. The AMF 435 in charge of managing access and mobility for UE 110. The UE 110 may request a MBMS service, which can be handled by the CP functions of CN. For example, the SMF 436 would associate the UE with a MBMS session. The AUSF 432 may provide encryption and/or decryption keys to the UE 110 via the SMF 436 during the MBMS session binding.

In brief, in FIG. 5 the functionality of the functionality of both the MF and SF functions are moved from the BM-SC into the CN. In FIGS. 6 and 7 only of the MF and SF functions are moved from the BM-SC into the CN. In FIG. 8 the functionality of the entire BM-SC is moved into the CN, eliminating the need for a separate BM-SC node altogether. There are advantages of moving these functions into the CN. In FIG. 8, the cost of dedicated hardware for the BM-SC is eliminated altogether, whereas in FIGS. 5-7 the cost of the BM-SC is reduced. This can help optimize capacity, as BM-SCs tend to be fixed costs which may be underutilized during some time periods and strained during others. However by re-using general purpose CN infrastructure, resources can be allocated to MBMS services as needed. Further moving the functions of BM-SC subsystem into the CN can reduce the overhead utilized by CP signaling between the BM-SC and the CN. Further, for the embodiment illustrated in FIG. 8, the overhead associated with the UP NG6 and NG6-MBMS interfaces is also eliminated. In addition the multicast-broadcast may be deployed quicker, for example by installing additional software performing BM-SC functionalities in the same data center hosting CN functions.

FIG. 9 illustrates, in a flowchart, an example of a method 900 of providing access to a MBMS transmission, in accordance with examples of the network architecture 400. The method 900 may be performed by an AUSF 432 of a CN 130. During, or after the completion of, a network attach procedure, a UE 110 may request a MBMS service. The MBMS security function 442 sends a security code to access the MBMS service to the NEF, via the NG MBMS-NEF (to AUSF) interface. The AUSF 432 then receives the security code (910) from the NEF 434 via the NG AUSF-NEF interface. The AUSF 432 then sends the security code to the UE 110 (920) via the AMF 435. The UE 110 now has access to the MBMS transmission. Accordingly, it should be appreciated that in step 920, the AUSF sends the security code towards the UE, via intermediate nodes, which in this example includes the AMF 435. From the network architecture in FIG. 4, a person skilled in the art can understand that the AMF 435 forwards the security code to the UE 110 via the NG1 interface, it being understood that the NG1 interface traverses the (R)AN 120.

Figure 10:
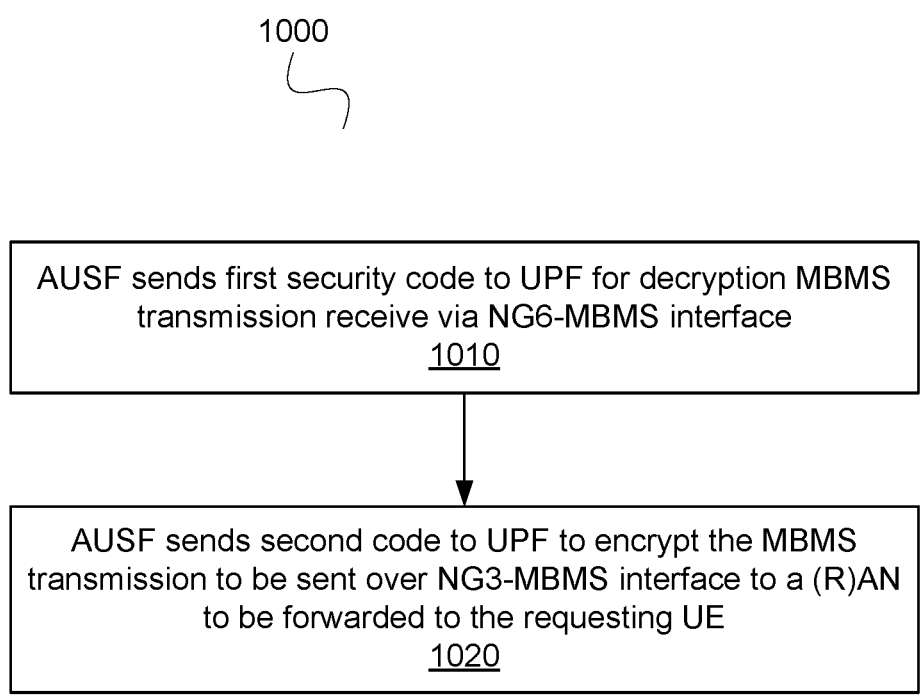
FIG. 10 illustrates, in a flowchart, an example of a method of transmitting a secured MBMS transmission, in accordance with examples of the network architecture

FIG. 10 illustrates, in a flowchart, an example of a method 1000 of transmitting a secured MBMS transmission, in accordance with examples of the network architecture 500, 600,800. The method 1000 may be performed by an AUSF 532 of a CN 130, and comprises the AUSF 532 sending a UPF 431,831 a first security code for decrypting a UE-requested MBMS transmission received at the UPF 431,831 over an NG6-MBMS interface. Next, the AUSF 532 sends to the UPF 431,831 a second security code to encrypt the MBMS transmission to be sent to a (R)AN over an N3-MBMS interface such that the (R)AN may forward the transmission to the requesting UE.

The NG4 interface is used for the SMF 436 to send the CP information to the UPF 431. Hence a person skilled in the art can understand that the security codes for encryption and decryption of MBMS data can be sent from the AUSF 532 to the SMF 436, in which case the SMF 436 forwards the security codes to the UPF 431, via AMF 435.

In some embodiments the SMF 436 receives membership information from the unified data management (UDM) function 433 in order to authorize the request from a UE 110. In some embodiments, the UDM 433 receives the membership information from the MF 441. In some embodiments, this is received from an external interface, for example when the MF 441 is located within the BM-SC. In some embodiments, the UDM 433 received the membership information from the MF 441 via internal signaling, for example when the MF 441 is integrated within the UDM 433.

Figure 13:
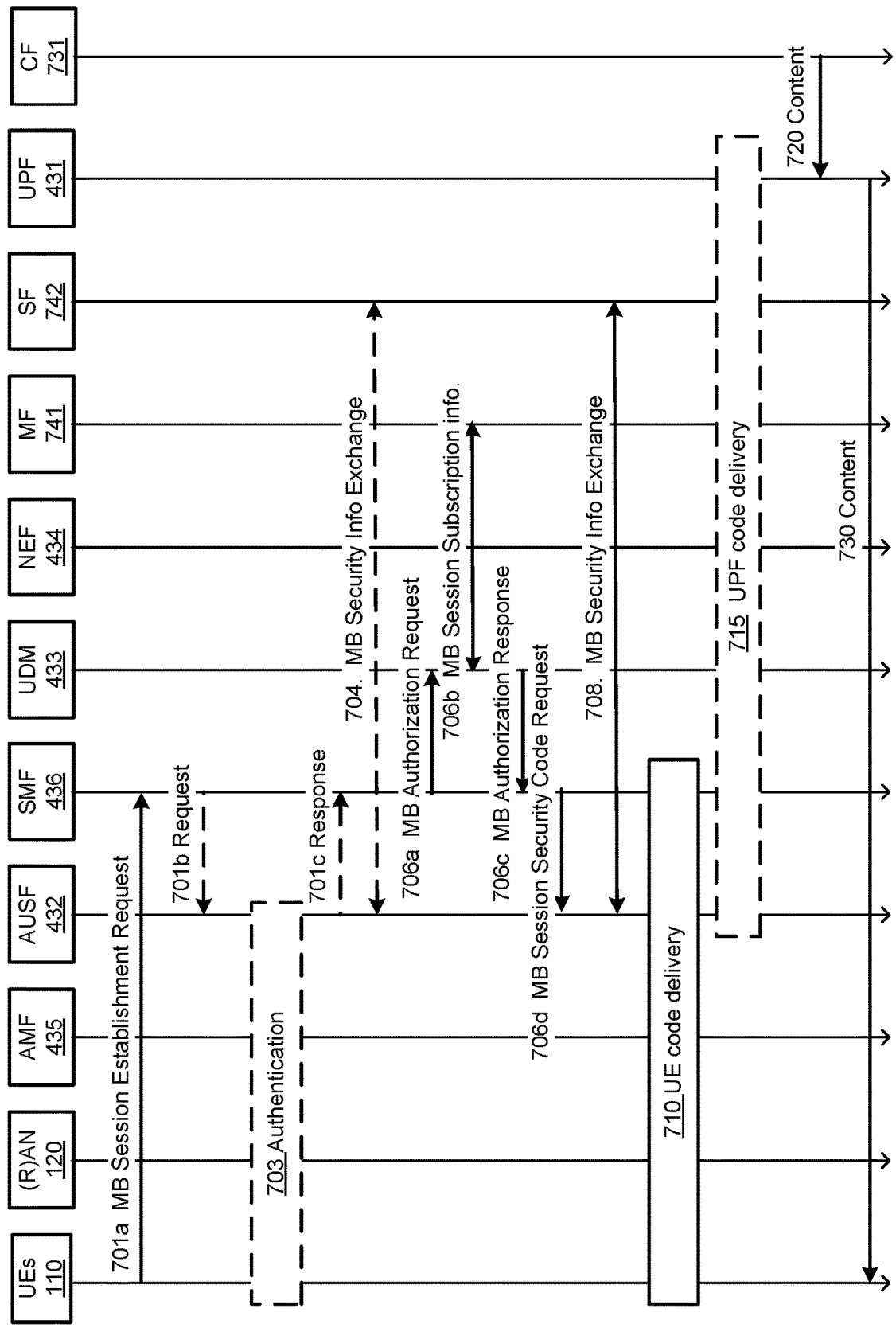
FIG. 13 is a call flow diagram illustrating a method according to an embodiment.

FIG. 13 is a call flow diagram illustrating a method according to an embodiment. Step 701*a* illustrates a MB session establishment request being sent from one of the UEs 110 to the SMF 436, via the (R)AN 120 and the AMF 435. Note that the MB session may exist and a UE 110 may join this existing MB session by means of this request. The UE 110 may include in the MB session establishment request information to identify the UE (e.g. SUPI and/or GPSI), the information to identify the service request (such as MB service), the content information to identify the required content (e.g. TV channel, name of movie, and the like), and the MB Session ID if the UE knows the MB Session ID. The SMF 436 may optionally send a request to the AUSF 432 at step 701*b* for an authentication procedure between the CN and the UE 110. The SMF 436 may include information for the AUSF 432 to identify the service that UE request, for example an identifier of a TV channel, an identifier of content (such as a name of movie), an MB Session Identifier, a UE identifier (e.g. SUPI (Subscription Permanent Identifier), 5G GPSI (Generic Public Subscription Identifier)), Group identifier of the UE. It should be appreciated that the AUSF may receive the request via an intermediate network function. In any event, the AUSF receives a request regarding one UE of the plurality of UEs 110 for accessing content directed to the plurality of UEs 110. An optional Authentication process (703) occurs between the UE and AUSF 432. Some UE 110 may be designed for MBMS service only and thus may not be required to perform registration with the CN. This type of device may be required to perform authentication procedure 703 in order to receive the MBMS service. The authentication procedure 703 is indicated as optional for the UE that may have been previously authenticated as part of a network attachment. In some embodiments, the authentication procedure 703 may involve the AMF 435 since the AMF 435 may serve as a security anchor point. In which case, the AUSF 432 may send security information to the AMF 435, and the AMF 435 performs an authentication procedure with the UE 110 for the MBMS service. After finishing the authentication procedure 703, the AUSF 435 sends a response at step 701*c* to the SMF 436.

An alternative implementation of the step 701*b* is that the SMF 436 may send a request to the AMF 435 for authenticating UE 110. The request includes the UE ID (such as SUPI), MB Session Identifier, information to identify the Service Request from the UE. The AMF 435 performs authentication procedure 703, which may involve the AUSF 432 obtaining a security code for secured communication over the radio interface. In the authentication procedure 703, the security code may be sent to and stored in the (R)AN 120. After finishing the authentication procedure 703, the AMF 435 sends a response 701*c* to the SMF.

Another alternative implementation of the authentication procedure 703 is that the AMF 435 first receives the MB session establishment request in step 701*a* from the UE 110. Before forwarding the MB session establishment request in step 701*a* to the SMF 436, the AMF 435 may send a request the AUSF 432 to perform authentication. The AUSF 432 performs the authentication procedure 703. The AUSF 432 may generate security code for secured communication over the radio interface. The detailed procedure is similar to that described in the step 9, clause 4.2.2.2.2, "General Registration" procedure of 3GPP TS 23.502. After authentication procedure 703 is finished, the AMF 435 forwards the message MB Session Establishment Request from the UE 110 to the SMF 436. Steps 701*b* and 701*c* are not required in such an embodiment.

If the SMF provided the information to identify the MB session request of the UE in step 701*b*, and if the security information for encrypting and decrypting content of the MB session is not available in the AUSF, in step 704 a MB session security information exchange occurs at step 704 between the AUSF 432 and a security function SF 742. In some embodiments, the security function SF 742 can be instantiated as a core network function where the security codes for content encryption/decryption are generated and/or stored within the core network. In the embodiments illustrated in FIGS. 5, 6 and 8, the SF 742 can be the integrated SF 542.

An alternative implementation of step 704 is that the SMF 436 may communicate with the MF 741 either directly or indirectly via NEF 434 to get the security code for data encryption and decryption. The SMF 436 may provide to the MF 741 the information to identify the UE 110 such as GPSI, the information to identify the group of UE (such as External Group Identifier), content information, an MB Session Identifier.

The SMF 436 may send in step 706*a* a MB authorization request for session subscription information to the UDM 433. The SMF 436 may include in the MB authorization request a UE ID (e.g. SUPI), DNN, MB Session ID, PDU Session Type, content information, Internal Group ID, and SMF ID. The UDM 433 may communicate with the membership function 741 for authorization of the MB session in step 706*b*. The UDM 433 may include the information to identify the UE 110 such as GPSI, the information to identify the group of UE (such as Internal Group ID or External Group ID), content information, an MB Session Identifier. The messages exchange between the UDM 433 and MF 741 may be sent directly or indirectly via the NEF 434. The NEF 434 may perform some information translation, for example replacing the Internal Group ID to External Group ID). In some embodiments, the membership function 741 can be instantiated as a core network function with subscription information stored within the core network but supplied by the mobile network operator or by content provider. In the embodiments illustrated in FIGS. 5, 7 and 8, the MF 741 can be the integrated MF 541*a*, and message exchange at step 706a can involve internal signalling, and may be not required if the UDM 433 itself is configured with the MBMS subscription information. In other embodiments, the MF 741 is located external to the CN, e.g., MF 441 of the BM-SC, in which case message exchange 706a can involve the NEF 434. The UDM 433 then sends the MB session authorization 706c to the SMF 436.

The SMF 436 then may request the AUSF 432 for security codes of the multicast content in step 706d. The step 706d occurs if the SMF 435 does not have security codes the multicast content of an existing MB session, or new security codes are required for an existing MB session. The SMF 436 may include information for the AUSF 432 to identify the service requested by the UE, for example content information (such as an identifier of a TV channel, an identifier of content (such as a name of movie)), an MB Session Identifier, a UE identifier (e.g. SUPI and/or 5G GPSI), Internal Group of UE.

Responsive to the request from the SMF 436 in step 706d, if the security information for encrypting and decrypting content of the MB session is not available in the AUSF, an MB session security information exchange occurs 708 between the AUSF 432 and a security function SF 742. The AUSF 432 may send to the SF 742 some information that identifies the service that UE request, for example content information (such as an identifier of a TV channel, an identifier of content (such as a name of movie)), an MB Session Identifier, a UE identifier (e.g. 5G GPSI), a group identifier. In some embodiments, the security function SF 742 can be instantiated as a core network function where security codes for content encryption/decryption are generated and/or stored within the core network; in which case step 708 may be an internal communication within the AUSF 432. In the embodiments illustrated in FIGS. 5, 6 and 8, the SF 742 can be the integrated SF 542.

The AUSF 432 sends in step 710 the decryption code towards the requesting UE. It should be appreciated that this can be done in a number of ways. For example, the AUSF 432 can send the decryption code to the AMF 435 for forwarding to the UE. As another example, the AUSF 432 can send the decryption code to the SMF 436 which then sends to the AMF 435 for forwarding to the UE.

As an alternative, the SMF 436 may store the existing decrypting code of the MB session; steps 706d and 708 may be not needed. The SMF 436 may send the locally stored decrypting code to be sent to the UE 110.

The UPF 431 may perform some local content processing, such as video transcoding. The UPF 431 may need to decrypt content received from content provider or from BM-SC and encrypt the processed content before sending towards the UE 110. In this case, the AUSF 432 may send the security codes for decrypting and encrypting content to the UPF 431 via the SMF 436 in step 715. Alternatively, the SMF 436 may store locally the decrypting and encrypting codes; the SMF 436 may send the locally stored decrypting and encrypting codes to the UPF 431. The message in step 715 from the SMF 436 to the UPF 431 may also include MB Session ID, and content information.

After the step 710, the MBMS content may be sent in step 720 from the CF 731, or BM-SC (not shown), or content provider (not shown), or another function, to the UPF 431 which forwards in step 730 the content towards the UEs 110. In some embodiments, the UPF receives the encryption codes from the AUSF 432 as part of step 715. The UPF 431 receives in step 720 the content from a cache function (CF 731). In some embodiments, the CF 731 can be an external function, such as the SAF 445 of the BM-SC 440 as illustrated in FIGS. 4-7. In some embodiments, the CF 731 can be integrated within the UPF (e.g., UPF 831 of FIG. 8). The UPF 431 encrypts the received content using the encryption codes to produce encrypted content transmits 730 the encrypted content towards the plurality of UEs via one or more Radio Access Network (RAN) nodes. In some embodiments step 730 involves multicasting the content to a plurality of RAN nodes, for forwarding to the plurality of UEs. In some embodiments step 730 involves broadcasting the content to a plurality of RAN nodes associated with the plurality of UEs.

Figure 11:
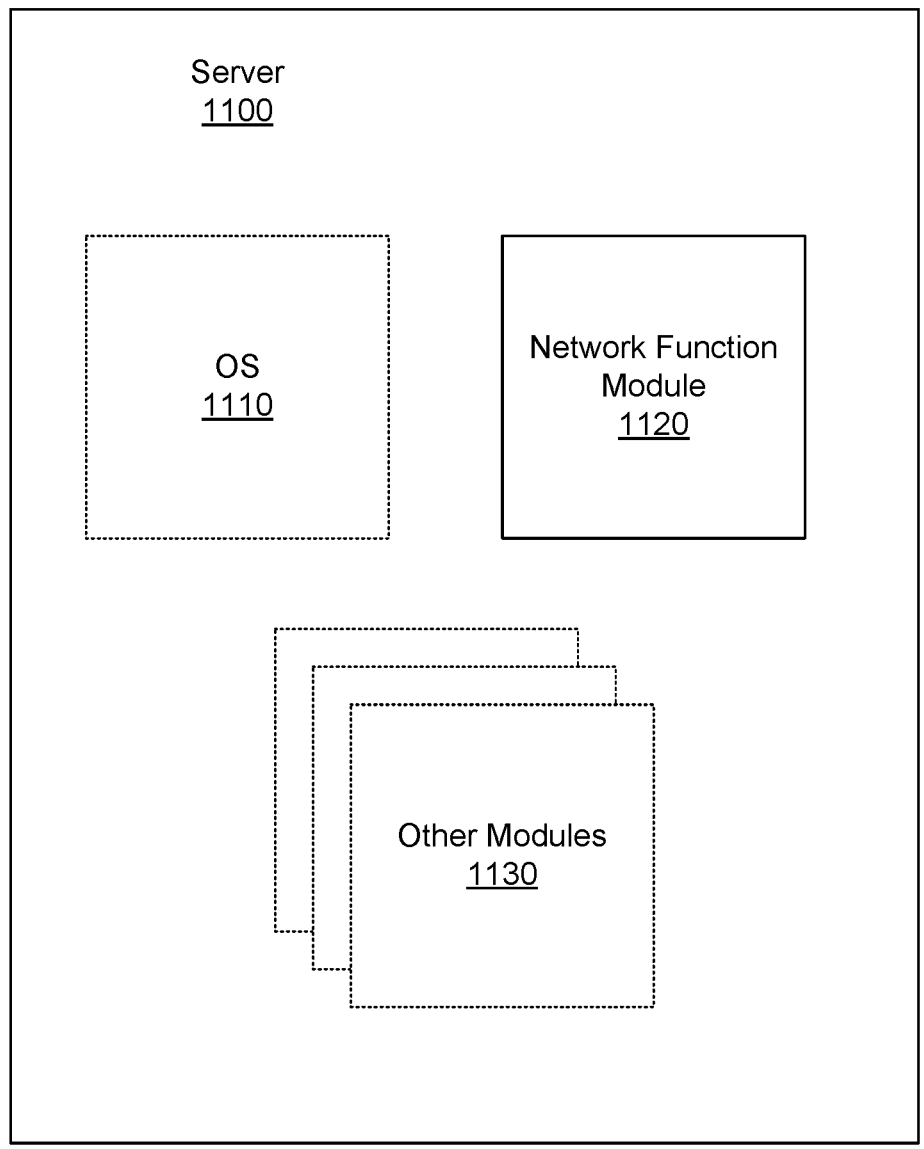
FIG. 11 illustrates, in a block diagram, an example of a server located on the sub-network that implements a network function.

FIG. 11 illustrates, in a block diagram, an example of a server 1100 located on the sub-network that implements a network function described above in FIGS. 4 to 8. The server 1100 comprises an operating system 1110, a network function module 1120 that implements a network function described above in FIGS. 4 to 8, and other modules 1130 used by the server 1100 for other purposes. The network function implemented in the network function module 1110 may be any of the network functions shows in FIGS. 4 to 8, above. For example, the MRMF 425 may be implemented in a corresponding server 1100 on a (R)AN 430 sub-architecture network. If a network function module 1110 implements a function in the CN 130, then its corresponding server 1100 is located in the CN 430,530,630,730,830 sub-architecture network. Similarly, if a network function module implements a BM-SC function in the DN 140, then its corresponding server 1100 is located in the DN 140 (i.e., at the BM-SC 440,540,640,740). It is noted that network functions that are logically grouped together within a sub-network may be co-located on a corresponding group server.

Figure 12:
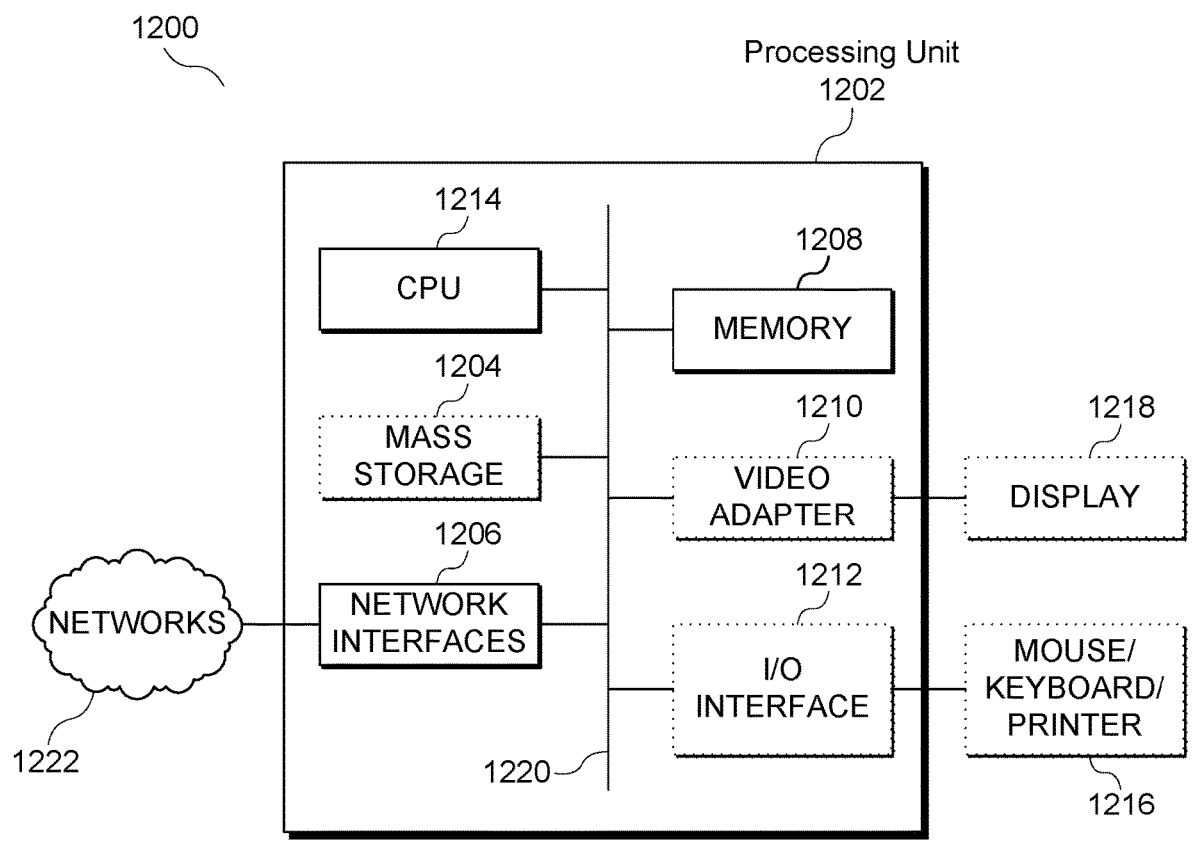
FIG. 12 illustrates, in a block diagram, a computing system that may be used for implementing the devices and methods disclosed herein.

FIG. 12 illustrates, in a block diagram, a computing system 1200 that may be used for implementing some of the devices and methods disclosed herein. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1200 includes a processing unit 1202. The processing unit 1202 includes a central processing unit (CPU) 1214, memory 1208, and may further include a mass storage device 1204, a video adapter 1210, and an I/O interface 1212 connected to a bus 1220.

The bus 1220 may be one or more of any type of several bus architectures including a memory bus or memory controller, a peripheral bus, or a video bus. The CPU 1214 may comprise any type of electronic data processor. The memory 1208 may comprise any type of non-transitory system memory such as static random access memory (SRAM), dynamic random access memory (DRAM), synchronous DRAM (SDRAM), read-only memory (ROM), or a combination thereof. The memory 1208 may include ROM for use at boot-up, and DRAM for program and data storage for use while executing programs.

The mass storage 1204 may comprise any type of non-transitory storage device configured to store data, programs, and other information and to make the data, programs, and other information accessible via the bus 1220. The mass storage 1204 may comprise, for example, one or more of a solid state drive, hard disk drive, a magnetic disk drive, or an optical disk drive.

The video adapter 1210 and the I/O interface 1212 provide interfaces to couple external input and output devices to the processing unit 1202. As illustrated, examples of input and output devices include a display 1118 coupled to the video adapter 1210 and a mouse/keyboard/printer 1216 coupled to the I/O interface 1212. Other devices may be coupled to the processing unit 1202, and additional or fewer interface cards may be utilized. For example, a serial interface such as universal serial bus (USB) (not shown) may be used to provide an interface for an external device.

The processing unit 1202 may also include one or more network interfaces 1206, which may comprise wired links, such as an Ethernet cable, and/or wireless links to access nodes or different networks. The network interfaces 1206 allow the processing unit 1202 to communicate with remote units via the networks. For example, the network interfaces 1206 may provide wireless communication via one or more transmitters/transmit antennas and one or more receivers/receive antennas. The processing unit 1202 may be coupled to a local-area network 1222 or a wide-area network for data processing and communications with remote devices, such as other processing units, the Internet, or remote storage facilities.

Unless defined otherwise, all technical and scientific terms used herein have the same meaning as commonly understood by one of ordinary skill in the art to which this invention belongs.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Further embodiments of the present invention are provided in the following. It should be noted that the numbering used in the following section does not necessarily need to comply with the numbering used in the previous sections.

Embodiment 1

A network architecture comprising:
a core network (CN) comprising an authentication server function (AUSF) and a network exposure function (NEF) communicatively connected via a NG AUSF-NEF interface; and
a broadcast-multicast service-centre (BM-SC) comprising a security function communicatively connected to the NEF via a NG MBMS-NEF interface.

Embodiment 2

A network architecture comprising:
a core network (CN) comprising an authentication server function (AUSF), a network exposure function (NEF) and a policy control function (PCF), the AUSF and the NEF communicatively connected via a NG AUSF-NEF interface, the NEF and the PCF communicatively connected via a NG PCF-NEF interface; and
a broadcast-multicast service-centre (BM-SC) comprising a membership function, the membership function communicatively connected to the NEF via a NG MBMS-NEF interface, and the membership function communicatively connected to the PCF via a NG5 interface.

Embodiment 3

A network architecture comprising:
a core network (CN) comprising an authentication server function (AUSF), a network exposure function (NEF) and a policy control function (PCF), the AUSF and the NEF communicatively connected via a NG AUSF-NEF interface, the NEF and the PCF communicatively connected via a NG PCF-NEF interface; and
a broadcast-multicast service-centre (BM-SC) comprising a membership function and a security function;
wherein the membership function communicatively connected to the NEF via a NG MBMS-NEF interface, and the membership function communicatively connected to the PCF via a NG5 (QoS) interface; and
wherein the security function communicatively connected to the NEF via a NG MBMS-NEF interface.

Embodiment 4

A network architecture comprising:
a broadcast-multicast service-centre (BM-SC) comprising a proxy and transport function, a service announcement function and a session and transmission function communicatively connected to each of the proxy and transport function and the service announcement function; and
a core network comprising a user plane function (UPF) communicatively connected to the proxy and transport function via a first NG6-MBMS interface and communicatively connected to the service announcement function via a second NG6-MBMS interface;
wherein a multicast and broadcast multimedia subsystem (MBMS) transmission received at the session and transmission function is forwarded to the proxy and transport function, then forwarded over the NG6-MBMS interface to the UPF, then forwarded to an access node (AN) over a NG3-MBMS interface.

Embodiment 5

A method of providing access to a multicast and broadcast multimedia subsystem (MBMS) transmission, the method comprising an authentication server function (AUSF) on a core network (CN):
receiving a security code from a multicast and broadcast multimedia subsystem (MBMS) security function of a broadcast-multicast service-center (BM-SC), the security code received from a network exposure function (NEF) via a NG AUSF-NEF interface, the NEF having received the security code from the MBMS security function via a NG MBMS-NEF interface; and
sending the security code to a requesting user equipment.

Embodiment 6

A method of transmitting a secured multicast and broadcast multimedia subsystem (MBMS) transmission, the method comprising an authentication server function (AUSF):

sending to a user plane function (UPF) a first security code for decrypting a user equipment (UE)-requested MBMS transmission received at the UPF via a NG6-MBMS interface; and sending to the UPF a second security code for encrypting the MBMS transmission to be sent to an access network (AN) over an N3-MBMS interface, the UE connected to the AN.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method of providing content from a content provider to a plurality of User Equipment (UE)s using at least one of a multicast and broadcast data transmission, the method comprising:
   receiving, by an authentication server function (AUSF) of a core network (CN), a request for an authenticated UE to access the content directed to the plurality of UEs;
   receiving, by the AUSF of the CN, security information comprising a decryption code from a security function which provides the decryption code for use by the authenticated UE to decrypt the content; and
   sending, by the AUSF of the CN, the decryption code towards the authenticated UE.

2. The method of claim 1 wherein sending the decryption code towards the authenticated UE comprises sending the decryption code to an access and mobility management function (AMF) for forwarding to the authenticated UE.

3. The method of claim 1 wherein sending the decryption code towards the authenticated UE comprises sending the decryption code to a Session Management Function (SMF) for forwarding to the authenticated UE via an access and mobility management function (AMF).

4. The method of claim 1 further comprising:
   sending, by the AUSF of the CN, to a Session Management Function (SMF) a second decryption code for use by a User Plane Function (UPF) in decrypting content received by the UPF from the content provider, the received content directed to the plurality of UEs; and
   sending, by the AUSF of the CN, to the SMF a first security code for use by the UPF in encrypting the requested content for forwarding towards the plurality of UEs, the first security code corresponding to the decryption code.

5. The method of claim 1 wherein the security function is at least one of:
   instantiated as a core network function with the security information generated and stored within the CN; and
   located external to the core network.

6. The method of claim 1 wherein the security information is received via another core network function.

7. A method of establishing a session for providing content to a plurality of User Equipment (UE)s using at least one of a multicast and broadcast data transmission, the method comprising:
   receiving, by a Session Management Function (SMF) of a core network (CN), a request for an authenticated UE to access the content directed to the plurality of UEs;
   requesting, by the SMF of the CN, authorization from a unified data management (UDM) function of the CN which is configured to receive membership information from a membership function; and
   initiating, by the SMF of the CN, the transmission of a decryption code towards the UE.

8. The method of claim 7 wherein the membership function is at least one of:
   instantiated as a core network function with the membership information stored within the core network but supplied by a content provider; and
   located external to the core network.

9. The method of claim 7 wherein the membership information is received via another core network function.

10. The method of claim 7 further comprising:
    after receiving the request, forwarding, by the SMF of the CN, the request to an authentication server function (AUSF) of the core network (CN) to authenticate the UE.

11. The method of claim 7 wherein initiating, by the SMF of the CN, the transmission of a decryption code towards the UE comprises at least one of:
    transmitting, by the SMF of the CN, a previously stored decryption code towards the UE; and
    requesting, by the SMF of the CN, the decryption code from an authentication server function (AUSF) of the core network (CN).

12. A method of providing content from a content provider to a plurality of UEs, the method executed by a user plane function (UPF) of a core network (CN), the method comprising:
    receiving, by the UPF of the CN, content provided from the content provider to the plurality of UEs;
    storing, by the UPF of the CN, the content in a cache function;
    receiving, by the UPF of the CN, an encryption code from an authentication server function (AUSF);
    receiving the content from the cache function;
    encrypting, by the UPF of the CN, the received content using the encryption code to produce encrypted content; and
    transmitting, by the UPF of the CN, the encrypted content towards the plurality of UEs via at least one Radio Access Network (RAN) node.

13. The method of claim 12 wherein the transmitting, by the UPF of the CN, the encrypted content comprises multicasting the encrypted content to each of the at least one RAN node.

14. The method of claim 12 wherein the transmitting, by the UPF of the CN, the encrypted content comprises broadcasting the encrypted content to each of the at least one RAN node.

15. The method of claim 12 wherein the cache function is a core network cache function.

16. The method of claim 12 wherein the UPF is configured to support multicast and broadcast data distribution to multiple RAN nodes and receiving the content from a cache function comprises receiving the content over an interface.

17. The method of claim 12 wherein transmitting the encrypted content towards the plurality of UEs comprises transmitting the encrypted content using an interface.

18. An authentication server function (AUSF) of a core network (CN) for providing content from a content provider to a plurality of User Equipment (UE)s using at least one of a multicast and broadcast data transmission, the AUSF comprising:
    a network interface;
    a processor;

a non-transitory machine readable medium storing machine executable instructions which when executed by the processor cause the AUSF to:
receive a request for an authenticated UE to access the content directed to the plurality of UEs;
receive security information comprising a decryption code from a security function which provides the decryption code for use by the authenticated UE to decrypt the content; and
send the decryption code towards the authenticated UE.

19. A user plane function (UPF) of a core network (CN) for providing content from a content provider to a plurality of User Equipment (UE)s using at least one of a multicast and broadcast data transmission, the UPF comprising:
a network interface;
a processor;
a non-transitory machine readable medium storing machine executable instructions which when executed by the processor cause the UPF to:
store content provided from the content provider in a cache function;
receive an encryption code from an authentication server function (AUSF) of the core network;
receive the content from the cache function;
encrypt the received content using the encryption code to produce encrypted content; and
transmitting the encrypted content towards the plurality of UEs via at least one Radio Access Network (RAN) node.

* * * * *